United States Patent
Horton et al.

(10) Patent No.: US 6,354,396 B1
(45) Date of Patent: Mar. 12, 2002

(54) ELECTRIC POWER ASSISTED STEERING SYSTEMS

(75) Inventors: Steven John Horton, West Midlands; Russell Wilson-Jones, Stratford-upon-Avon; Simon David Stevens, Birmingham, all of (GB)

(73) Assignee: TRW LucasVarity Electric Steering Ltd., West Midlands (GB)

( * ) Notice: Subject to any disclaimer, the term of this patent is extended or adjusted under 35 U.S.C. 154(b) by 0 days.

(21) Appl. No.: 09/496,705

(22) Filed: Feb. 2, 2000

(30) Foreign Application Priority Data

Feb. 5, 1999 (GB) .............................................. 9902438

(51) Int. Cl.⁷ ............................................... B62D 5/04
(52) U.S. Cl. ..................................................... 180/446
(58) Field of Search .............................. 180/443, 444, 180/446

(56) References Cited

U.S. PATENT DOCUMENTS

| | | | | |
|---|---|---|---|---|
| 4,715,461 A | * | 12/1987 | Shimizu | ...................... 180/446 |
| 5,423,391 A | * | 6/1995 | Shimizu | ...................... 180/446 |
| 6,129,172 A | * | 10/2000 | Yoshida et al. | .............. 180/446 |

* cited by examiner

Primary Examiner—Kevin Hurley
(74) Attorney, Agent, or Firm—Tarolli, Sundheim, Covell, Tummino & Szabo L.L.P.

(57) ABSTRACT

An electric power assisted steering system is disclosed which comprises a steering shaft connected at one end to the handwheel and at its other end to at least one roadwheel, while an electric motor is connected to the steering a gearbox having a non-integer reduction gear ratio. Two sensors are also provided with one sensing the angular position of the motor rotor and the other sensing the angular position of the steering shaft. The presence of the non-integer gear ratio produces a beat frequency between the output of the two sensors from which an unambiguous measurement of the angular position of the steering shaft over a range of greater than one complete revolution can be made. The sensors may comprise either absolute position sensors or index-type sensors.

15 Claims, 14 Drawing Sheets

| MOTOR REVOLUTIONS $m$ | -10 | -9 | -8 | -7 | -6 | -5 | -4 | -3 | -2 | -1 | 0 | 1 | 2 | 3 | 4 | 5 | 6 | 7 | 8 | 9 | 10 | 11 |
|---|---|---|---|---|---|---|---|---|---|---|---|---|---|---|---|---|---|---|---|---|---|---|
| COLUMN ANGLE $qm/p$ | 50/17 | 45/17 | 40/17 | 35/17 | 30/17 | 25/17 | 20/17 | 15/17 | 10/17 | 5/17 | 0/17 | 5/17 | 10/17 | 15/17 | 20/17 | 25/17 | 30/17 | 35/17 | 40/17 | 45/17 | 50/17 | 55/17 |
| NUMBER OF COLUMN REVOLUTIONS $r$ | -3 | -3 | -3 | -3 | -2 | -2 | -2 | -1 | -1 | -1 | 0 | 0 | 0 | 0 | 1 | 1 | 1 | 2 | 2 | 2 | 2 | 3 |
| COLUMN SENSOR OUTPUT AT EACH MOTOR REVOLUTION $c=(qm-pr)/p$ | 1/17 | 6/17 | 11/17 | 16/17 | 4/17 | 9/17 | 14/17 | 2/17 | 7/17 | 12/17 | 0/17 | 5/17 | 10/17 | 15/17 | 3/17 | 8/17 | 13/17 | 1/17 | 6/17 | 11/17 | 16/17 | 4/17 |
| NUMBER OF COMPLETE $q/p$ $s$ | 0 | 1 | 2 | 3 | 0 | 1 | 2 | 0 | 1 | 2 | 0 | 1 | 2 | 3 | 0 | 1 | 2 | 0 | 1 | 2 | 3 | 0 |
| FRACTIONAL PART TO BE SUBTRACTED $sq/p$ | 0/17 | 5/17 | 10/17 | 15/17 | 0/17 | 5/17 | 10/17 | 0/17 | 5/17 | 10/17 | 0/17 | 5/17 | 10/17 | 15/17 | 0/17 | 5/17 | 10/17 | 0/17 | 5/17 | 10/17 | 15/17 | 0/17 |
| REMAINDER $d=c-sq/p$ | 1/17 | 1/17 | 1/17 | 1/17 | 4/17 | 4/17 | 4/17 | 2/17 | 2/17 | 2/17 | 0/17 | 0/17 | 0/17 | 0/17 | 3/17 | 3/17 | 3/17 | 1/17 | 1/17 | 1/17 | 1/17 | 4/17 |
| REMAINDER MULTIPLIED BY $p$ $pd$ | 1 | 1 | 1 | 1 | 4 | 4 | 4 | 2 | 2 | 2 | 0 | 0 | 0 | 0 | 3 | 3 | 3 | 1 | 1 | 1 | 1 | 4 |

*Fig. 20*

ELECTRIC POWER ASSISTED STEERING SYSTEMS

This invention relates to improvements in electrical power assisted steering systems, and in particular to an improved apparatus for measuring the absolute steering angle of the road wheels.

Typical electric power assisted steering systems comprise a steering shaft operatively connected at a first end to a steering wheel and at its opposite end operatively connected to the roadwheels of a vehicle. An electric motor is provided which can apply torque to the steering shaft through a reduction gearbox. The gearbox may be of the worm and wheel, or other, type.

A steering gear is provided between the steering shaft and the steered wheels. This steering gear typically provides a substantial gearing between angular movement of the steering shaft (and hence hand wheel) and the movement of the roadwheels. For a typical road vehicle, more than one turn a of the handwheel (i.e. complete revolution of the steering shaft) is needed to move the roadwheels from lock to lock.

It is desirable to be able to measure the steering angle of the roadwheels. This can be used to influence a number of sub-systems in the vehicle such as suspension damper control systems, vehicle stability control systems and vehicle lane guidance.

One solution to the problem would be to provide an angular position sensor on the steering shaft to measure the angle of rotation of the steering shaft. However, as more than one fill revolution is needed to turn from lock to lock such a measurement would not unambiguously describe the angle of the roadwheels.

The problem of measuring multiple turns of the steering shaft can be overcome in several ways, each with its own disadvantage.

In one proposal, the steering shaft angular position sensor can be driven by the steering shaft through a step down gear, reducing the total number of turns of the sensor to less than one full revolution. This overcomes the problem of ambiguity, but unfortunately reduces the resolution which can be obtained from the sensor. To produce a high resolution system is therefore expensive.

According to the present invention, we provide an electric power assisted steering system comprising: a steering shaft operatively connected at a first end to a handwheel and at its other end operatively connected to at least one roadwheel, an electric motor having a rotor operatively connected to the steering shaft through a gearbox having a non-integer reduction gear ratio, a first sensing means adapted to produce an output dependent on the angular position of the steering shaft; a second sensing means adapted to produce an output dependent on the angular position of the rotor, and processing means adapted to process both output signals to produce an angular position signal indicative of the angular position of the steering shaft over a range of greater than one complete revolution.

The invention thus employs outputs from two sensors, one monitoring the position of the steering shaft and the other monitoring the position of the motor rotor to provide, if desired, an unambiguous measurement of steering shaft angle over a range of angles in excess of one full revolution.

Preferably, both sensors are adapted to produce a cyclic output signal dependent upon angular position which repeats after a complete revolution, or perhaps a fraction of a full revolution. The cycle may repeat upon a complete rotation of the associated steering shaft or motor rotor, i.e. 1 cycle corresponds to 360° of rotation. For example, one sensor may produce an absolute angular position value which varies substantially linearly over the range 0–360 degrees of rotation between a value of 0 and 1. The sensor will therefore produce the same output value for shaft or rotor positions of 90°, 90°+360°, 90°+720° etc. Alternatively, it may have a range of 0–180°, and thus the cycle will repeat itself once within a single revolution.

At least one of the sensors may comprise an absolute angular position sensor. By this we mean that the sensor produces a signal that represents the absolute angular position of the shaft or rotor within a complete revolution (or part of a revolution). Examples of sensors of this kind include potentiometers, a resolver, a synchro and an optical angle encoder. For clarity, it is assumed that the absolute sensor produces an output that varies substantially linearly between 0 and 1 over its range of output values.

Alternatively, at least one of the sensors may comprise an index sensor. By this we mean a sensor which is adapted to produce an output signal dependent on angle which is indicative of the position of the shaft within a small fraction of a revolution. Such a sensor may, for example produce a short pulse as the shaft rotates past its index position, and zero output in all other positions. Again, more than one index pulse may be produced within a single revolution, i.e. two equal-spaced pulses per complete revolution.

Preferably, the sensors are driven directly from the steering shaft or motor rotor without intermediate gearing. Thus, with a sensor having a cycle of 360 degrees, for one turn of the shaft the sensor measures one full revolution.

Preferably, the gear ratio may be expressed as p/q whereby the motor turns through p/q revolutions for each revolution of the steering shaft, p is greater than q, q is greater than unity, and the greatest common integer factor of p and q is also unity.

By gearbox ratio, we mean the ratio between the rotation of the two sensors. Thus, if each sensor produces an output value over a range corresponding to one full revolution, the gear ratio is the turns ratio between the input side and output side of the gearbox. If one sensor produces an output which cycles or repeats n times within one revolution of its respective shaft or rotor, the gearbox ratio will be np'/q where np'=p as herein before.

By selecting a non-integer ratio, the outputs of the two sensors will drift out of synchronisation as the steering shaft rotates. Eventually, after a predetermined number of revolutions, the output will return into synchronisation This "beating" enables an unambiguous measurement of rotation over a range greater than one revolution to be achieved from sensors which produce an output over a range of one revolution or less.

In one arrangement, the first sensing means comprises an absolute handwheel position sensor and the second sensing means comprises an index sensor adapted to produce an index signal at a known angular position of the motor rotor, said processing means being adapted to sample the output of the first sensing means corresponding to the position when the second sensing means produces an index signal;

multiply the sampled value by p;

round the multiplied value to the nearest integer to produce a reference value and use the reference value to access the corresponding entry in a look-up table, said entry being indicative of the number of revolutions of the steering shaft from an arbitrary zero position.

In another arrangement, the first sensing means may comprise an index sensor adapted to produce an index signal at a known angular position of the handwheel with the second sensing means comprising an absolute position sensor.

In yet a further alternative, both sensing means may comprise absolute position sensors. Again, the processing means is adapted to exploit the way in which the outputs of the sensors drift out of synchronisation and back into synchronisation after a number of revolutions to obtain a measure of the number of rotations of the steering shaft from an arbitrary zero angular position. A benefit of using two absolute position sensors is that it is no longer necessary to wait until one of the sensors passes an index, allowing a more regular estimate of position to be made.

In the event that both sensors comprise absolute position sensors, the processing means may be adapted to estimate the angular position of the motor rotor from a measurement of the angular position of the steering shaft assuming it is on its "zero" revolution. This estimate may then be compared with the actual output signal from the second sensing means, and the difference between the estimate and actual values processed to produce a signal indicative of the number of revolutions of the steering, shaft relative to an arbitrary zero angular position.

The processing means may therefore, in one system, be adapted to multiply the measured steering shaft position value output from the first sensing means by the gear ratio p/q to produce a predicted motor shaft position, sample the actual motor position from the second sensing means, compare the predicted value to the actual measured steering position, calculate the difference between the measured value and predicted value, and process the difference value to produce a value indicative of the number of turns of the steering shaft.

The processing means may be further adapted to calculate a residue of the difference and multiply the residue by q. This multiplied value may then be rounded off to the nearest integer, and the rounded value used to access a look-up table.

It is envisaged that the apparatus can be modified in a number of ways. For example, the second sensing means may in one arrangement comprise a number of Hall effect sensors adapted to detect the angular position of one or more magnets on the motor rotor.

In a most preferred arrangement, the motor may comprise a brushless permanent magnet motor and the motor sensor may comprise a number of Hall effect sensors adapted to detect the position of the magnetic poles. Three sensors may be provided for a three phase motor. This allows a resolution of $\frac{1}{6}^{th}$ of an electrical revolution of the rotor. For instance, with a 3 phase motor with 6 poles, the output will repeat 3 times for one whole revolution of the motor rotor.

The second sensing means may also be used to provide position information for use by a motor control circuit. For example, it can be used to calculate the timing for motor commutation events.

In accordance with a second aspect, the invention provides an electric power assisted steering system comprising a steering shaft operatively connected to one or more roadwheels and an electric motor adapted to apply an assistance torque to the shaft which incorporates a means adapted to check the relationship between the actual angular position of the steering angle and the expected angular position of the road wheel carriers.

The straight ahead position will vary in service. Specifically, the relationship between the angle or linear position of the steering system components may change due to wear or deformation of the chassis components, adjustment of the steering or suspension components or the replacement of steering system components. By checking the relationship between actual and measured angle such changes can be detected and compensated or corrected as necessary.

The measured angular position of the steering shaft may be produced using an electric power assisted steering system which embodies the first aspect of the invention.

It is envisaged that there are several preferred ways of achieving the checks by recognising that the vehicle is travelling in a straight line which are described below. Any number of these can be combined to detect if the vehicle is travelling in a straight line. If the methods detect that the absolute steering angle does not correspond with the straight-ahead detection then the offset on the absolute steering angle signal can be changed or the angle detection means can be stopped and a fault indicated.

1. The system may further include a yaw sensor adapted to detect that the vehicle is travelling in a straight line. The system may be adapted to measure the output of a first sensing means which comprises an absolute steering angle position sensor. It may then calculate an offset to correct the absolute steering angle signal so that it indicates the straighdt-ahead condition when the vehicle is travelling in a straight line.

The yaw sensor may be adapted to indicate a straight line travel when the quantity:

$$|\text{indicated yaw}|/\text{indicated vehicle speed}$$

is below a certain threshold for a period greater than a certain time. The, threshold and the duration can be chosen for the vehicle to which the system is applied. "|.|" indicates absolute value. The calculation must be protected from the case when the vehicle speed is zero, for example calculation may be disabled at low vehicle is speeds. The calculation may perhaps only be used when the rate of change in the vehicle speed is low.

2. The system may be adapted to decide that the vehicle is travelling in a straight line by monitoring the values of handwheel velocity and handwheel torque. An electric power steering system may therefore further include means for monitoring the handwheel velocity and means for monitoring the handwheel torque. The system may then be adapted to determine if the absolute value of the handwheel velocity is below a threshold, the absolute value of handwheel torque is below a threshold and the vehicle speed is above a threshold. In this condition it is highly likely that the steering system will be pointing substantially straight ahead. This condition can be made more discriminating by screening out the cases when the vehicle speed, handwheel torque or handwheel velocity are changing at a high rate.

3. Use a steering angle that is averaged over distance. The system therefore includes means for monitoring the average direction of travel of the vehicle. This is very close to straight ahead when large distances are considered. Therefore accumulating an average of the steering angle over distance will show if the absolute steering angle is well-aligned with the true straight-ahead. A low-pass filter may be provided that is adapted to filter the output of a steering shaft angular position sensor with respect to distance. This can be approximated by a time-based filter but a time-based filter will not work correctly at low vehicle speeds. A better approach is to let the input to the filter be an angle α, the filter output be an average angle A, the filter "time-constant" be k, the distance travelled be x and the vehicle velocity v. Then a first order low-pass filter that operates over distance is:

$$A = \int k(\alpha - A)dx$$

$$= \int k(\alpha - A)\frac{dx}{dt}dt$$

$$= \int k(\alpha - A)v dt$$

The input angle may be compared with the filter output to generate an error signal. The error is multiplied by the "time-constant" and the vehicle speed and is then integrated (over time). Thus, when the vehicle speed is zero the filter output will not change. When the vehicle speed is high the filter output will adapt quickly. This filter can be incorporated into the absolute steering angle detection scheme by applying the filter to, the absolute steering angle output; the output of the filter (after an appropriate settling time) can be used to detect the offset that the absolute steering angle has from zero. The offset may be stored in non-volatile memory and restored into the filter integrator for use on the next journey that the vehicle makes.

The stored offset should be bounded to prevent an excessive value being used. If the filter output exceeds a predetermined limit, then it may be desirable to disable the absolute steering angle detection scheme until it has been inspected at a service point.

Other Epas Drive Systems

There are other suitable cases in which two sensing means, each adapted to produce an output of angular position are geared with respect to one another by a train of gears and one sensor rotates with the handwheel and the other sensor rotates at a higher rate. The system of the first aspect may be modified to suit each case. The other cases to consider are listed below:

Pinion-drive: the first sensing means may be located on the driver side of a pinion shaft of a rack-and-pinion steering gear. The motor may then be adapted to drive the pinon instead of the steering shaft via a reduction gearbox as described hereinafter. Of course, this falls within the meaning of the term "operatively connected" to the steering shaft, as will be apparent to the skilled person.

Rack-drive: the first sensing means may be located on the driver side of a pinion shaft of a rack-and-pinion steering gear. The motor drives the rack directly through some gear-train that converts the motor's rotary motion to a linear motion (typically, this is a recirculating ball-nut that drives a lead-screw machined into the rack). The second sensing means may thus be geared to the rack which is geared to the pinion. The gear ratio between the motor and the pinion will be:

pinion revolutions per mm/motor revolutions per mm

Dual-pinion drive: this is a special case of the rack-drive in which the motor is adapted to drive the rack through a second pinion. The handwheel is connected to the first pinion and the first sensing means is mounted on the input shaft of the first pinion. The motor drives the second pinion via a reduction gearbox. Thus the gear ratio between the motor and the "column" angle sensors is:

motor reduction ratio×second pinion ratio/first pinion ratio

Although this is a more complex chain, provided it has a non-integer ratio, the rack position detection method can be employed.

The electric power assisted steering system of the first aspect of the invention produces an angular position signal for the steering shaft. There are many envisaged uses for this absolute steering angle signal. Protection may be sought for any of these uses. These include:

1. Providing a "powered-centering" function in which the electrical motor is adapted to provide a torque to the steering shaft which returns the steering system to the straight-ahead position. The system may be adapted to produce a torque demand that is added to the normal assistance torque demand to provide "powered-centering" that acts to return the road wheels to the straight ahead position when the driver releases the handwheel. For example when the steering system is rotated to steer the vehicle left, a torque that acts to turn the steering to the right may be added to the normal assistance torque and vice versa when the steering is turned to the right.

2. Enabling "soft" steering end-stops in which the EPAS system is adapted to drive the motor with an assistance torque which is reduced when the steering system is near to the end-stops. This prevents the driver from rotating the steering system quickly onto the end-stop and so "soft" end-stops can reduce the shock loads and the associated noise with hitting the end-stop of the steering. Clearly this can be combined with the powered-centering function. The torque may be added in the same manner as the powered-centering torque.

3. Providing a signal for use by a "Vehicle Dynamic Control" system that aims to control the yaw of a vehicle by braking different wheels. A VDC system computes the yaw that is required by the driver from the absolute steering angle and the vehicle speed; the actual yaw of the vehicle is measured by a yaw sensor and the difference between the measured and demanded values is used to control the distribution of the brake force to correct the yaw error. The absolute steering angle can be used as an input to the VDC controller.

4. Providing a signal for use by a damping control system in which the suspension damper units are "stiffened" when the vehicle is cornering. The absolute steering angle signal can be used to give advanced warning that the driver is entering a corner and the damping rate can be increased before the vehicle starts to roll. Once the vehicle is travelling in a straight course, the damping rate may be reduced to give a soft ride.

5. Providing a signal for use by a steering angle control system. Such a system may use a closed-loop feedback controller to generate an EPAS assistance torque that depends on the difference between a demanded steering angle and the absolute steering angle. The demanded steering angle may arise from some vehicle guidance system, for example, this could be a signal from a camera that determines the course of the road by recognising the lane markings or a signal from some roadside equipment that indicates the direction of the road.

It is envisaged that in at least one arrangement the invention may be successfully implemented in combination with an alternate scheme for detecting the steering angle. The system will be adapted to base its measurements on the output of one or other of the systems depending upon prevailing conditions such as recovery from battery failure.

One particular alternative system which it is envisaged could be used alongside the present invention is described in our earlier British application No. GB 9900774.7 filed on the Jan. 15, 1999. The disclosure of the earlier application is fully incorporated herein by reference, and is referred to as the "motor position counter" system whilst for clarity the system described herein relating to the first aspect of the present invention is referred to as "non-integer gear sensor" system.

The earlier dated application discloses an electrical power steering system in which the output from a motor position sensor, typically comprising a number of Hall effect devices, is combined with an index signal from a sensor connected to the steering shaft or the rack or perhaps a yaw sensor to produce an accurate measurement of steering angle by counting transitions in the output of the Hall effect sensors. The index sensor produces an index signal and the counter is reset when the index is produced to ensure the count does not drift out.

Thus, in accordance with a further aspect the invention provides an electric power-assisted steering system according to the first aspect of the invention in which the second sensing means is further adapted to produce an output signal indicative of angular position of the rotor which undergoes periodic transitions as the rotor rotates, the processing means being adapted to produce a second angular position signal indicative of the angular position of the steering shaft by counting transitions in the output of the second sensing means, the count being reset whenever the output of the first sensing means corresponds to an index position of the steering shaft, the processing means being adapted to combine both the first and second angular position signals to produce an authoritative angular position signal.

The invention of this aspect thus combines all of the features of the first aspect (producing a first position signal) with those of the invention described in G139900774.7 and provides an authoritative output based on the output of one or other of the systems.

The processing means may combine the first and second angular position signals by normally using the second angular position signal to produce the authoritative output whilst using the first angular position signal to verify the second position signal.

If the two angular position signals differ the output produced by the first aspect of the invention may be used as the basis of the authoritative output. This may continue to be used until the first sensing means produces an index signal and the count is reset. At this time it is known that the count is correct. This allows the system to produce an authoritative output after a fault when the count would otherwise be incorrect for the entire period of operation until the steering shaft rotates such that an index is produces (i.e. the output of the first sensor on the steering shaft is at the index position).

In an alternative the first angular position signal may be used to reset the count signal without waiting for the steering shaft to cross the index position. This can be done if the first angular position signal is deemed to be reliable. This situation may arise upon power-up, when the count may have been lost yet the first aspect of the invention produces an immediate reliable output.

It will, of course, be appreciated that the combination of both systems can provide a more accurate and reliable system whilst also providing valuable cross checking. As the systems share physical sensors hardware is minimised. Of course, one physical sensor may produce more than one output, i.e. an incremental output and a continuous output.

Both systems can be implemented so that they share physical sensors. In use the output of one system may have advantages over that of the other. The following method has been proposed:

On power-up, when the power steering system is first energised, the output determined by the motor position counter system is read. This initialises the authoritative angular position signal used within the control system. The output of the column position sensor, which measures absolute position, is used to incrementally update this signal as it has a higher resolution. The output produced by the non-integer gear sensor system is then used as a cross-check to detect steering wheel turn. If there is a large difference between the two signals, then the non-integer gear sensor system output can be used to reset the motor position counter system output and/or the system can stop using the position signal for the remainder of the journey.

In another situation, if a battery fault occurs and the motor position counter system output is lost (i.e. is unreliable) the counter signal will be invalid and so cannot be used at power-up. In this case the steering angle is not available until the non-integer gear sensor system can identify the correct steering wheel turn. As soon as the turn is identified the system can resort to using the motor position counter system by resetting the counter when the steering is in the straight ahead position. The normal operation described in the preceding paragraphs, based on the count system, can then be resumed, the non-integer gearing method being used as a back-up for cross-checking.

There will now be described, by way of example only, several embodiments of the present invention with reference to the accompanying drawings of which:

FIG. 20 is a table (No.2) illustrating the values produced upon rotation of the motor in one embodiment of the present invention.

Figure 1:
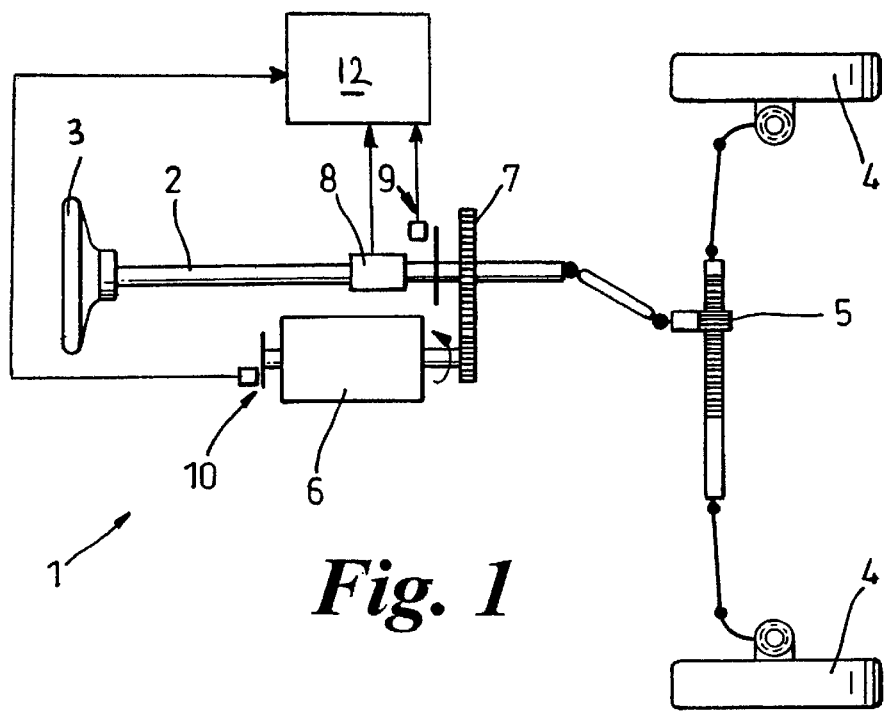
FIG. 1 is an illustration of an electric power steering system in accordance with the present invention.

Several different electric power steering systems in accordance with the present invention are described hereinafter. Each system has several common features which are illustrated in FIG. 1 of the accompanying drawings.

The system 1 comprises a steering shaft 2 co-operatively connected at one end to a handwheel 3 and at its other end to a pair of road wheels 4 through a rack and pinion 5. The handwheel 3 is adapted to rotate the steering shaft, in turn to displace the rack and eventually to turn the roadwheels. The amount of movement permissible for the handwheel between end stops (so-called "turns for lock to lock") is determined by the road wheel geometry and suspension design which supports the wheels, but in all cases exceeds one complete revolution, two to four revolutions being typical.

An electric motor 6 is connected to the steering shaft through a reduction gearbox 7 with a ratio $p^1/q$ whereby for p turns of the motor rotor the steering shaft passes through q turns or revolutions. A control circuit (not shown) provides current to the motor 6 in response to the output of a torque sensor 8 mounted on the steering shaft. The torque sensor 8 measures the torque demanded by the driver and from this the motor current is calculated to provide more or less assistance as demanded.

In addition to the torque sensor 8, an angular position sensor 9 is provided on the steering shaft 2 and a second angular position sensor 10 is provided on the motor rotor. Each sensor produces an output signal, and these signals are fed to a processing means 12 to produce a signal indicative of the position of the steering shaft over its complete range of rotation (i.e. for lock to lock).

The angular position sensors may be one of several types. To aid the understanding of the invention, several possible alternative types of position sensor will first be described although they are not to be considered exhaustive:

Types of Angular Position Sensor

Absolute Angle Sensor

This type of sensor produces a signal that represents the angle of a shaft within, for example, a complete revolution. The signal is available instantly with no storage or initialisation needed. Examples of this type of sensor are a potentiometer, a resolver, a synchro and an optical absolute angle encoder.

Figure 2:
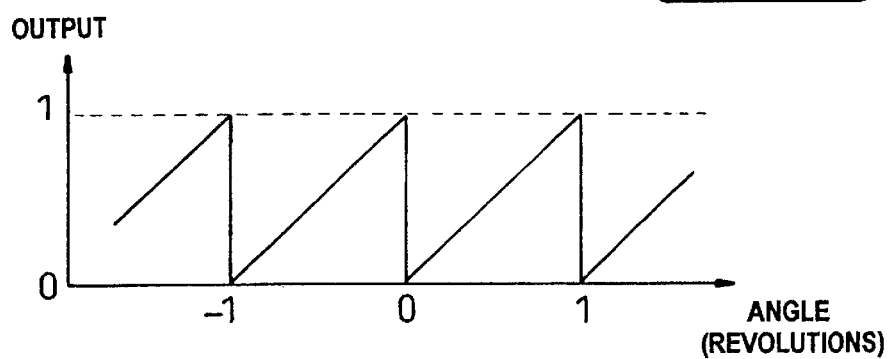
FIG. 2 is a graph showing a sample output from an absolute angular position sensor with a cycle of one revolution varying with the angular position of its associated shaft.

In this description, it is assumed that the angular position sensor output is processed to give a measurement that varies between 0 and 1 revolution in the manner shown in FIG. 2 of the accompanying drawings.

Index Pulse

Figure 3:
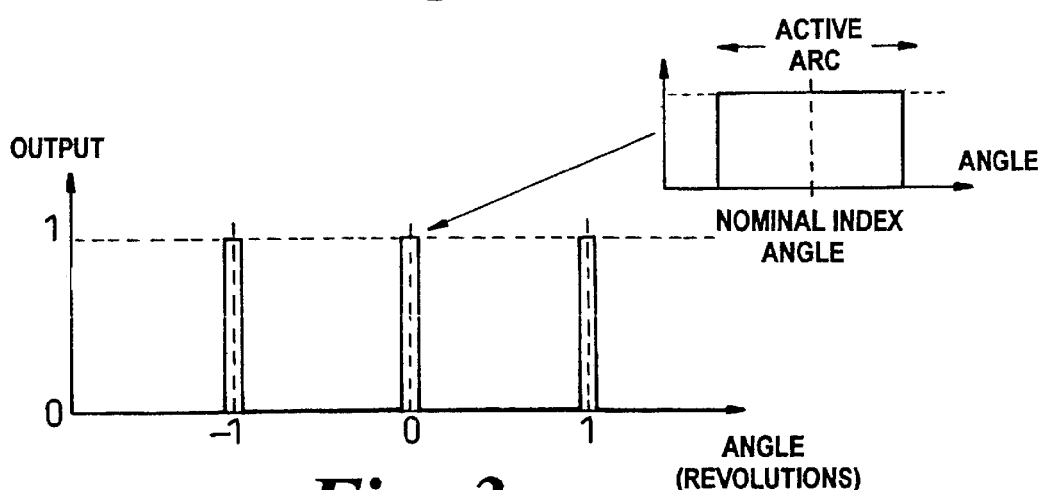
FIG. 3 is a graph showing a sample output from an index angular position sensor with a cycle of one revolution varying with the angular position of its associated shaft.

This type of sensor produces a single pulse within each revolution of the shaft. The sensor may be a Hall-effect sensor that detects a change in magnetic field that occurs over a small fraction of a revolution (see FIG. 3) or active arc. The accuracy of the sensing systems that employ this type of input rely on the active arc of the sensor being small. The sensor should be designed to ensure that this is the case. Of course, it will be appreciated that an absolute angle sensor such as that shown in FIG. 2 can be operated as an index sensor, for example by monitoring the angle when the output exceeds a predetermined threshold value.

Brushless Motor Angular Position Sensor

Figure 4:
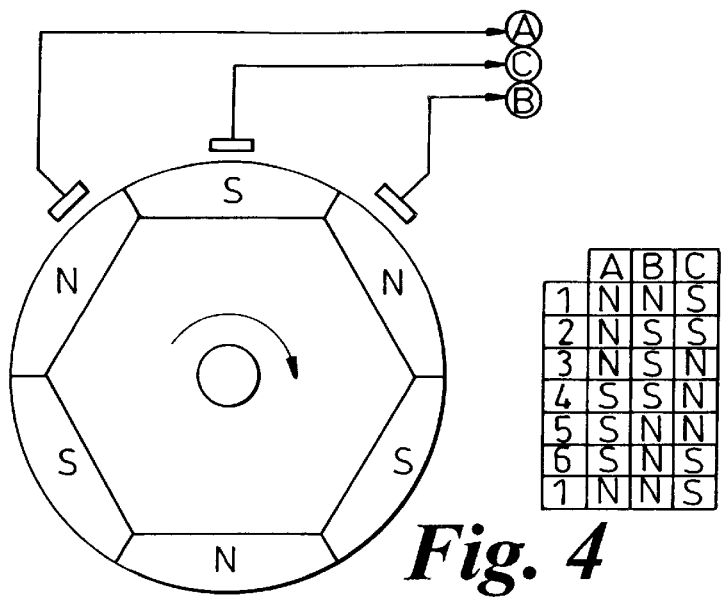
FIG. 4 is a schematic diagram of a three phase brushless permanent magnet motor in which three Hall effect sensors sense motor angular position.

Some EPAS systems use brushless motors in which a motor sensor is used to control the switching, or commutation, of motor windings. FIG. 4 shows a schematic diagram of a 3-phase brushless permanent motor rotor. In this case 3 magnetic sensors (e.g. Hall-effect) are used to sense which rotor magnet is nearby or the angle of a magnetised disc that is mounted on the rotor shaft.

Figure 5:
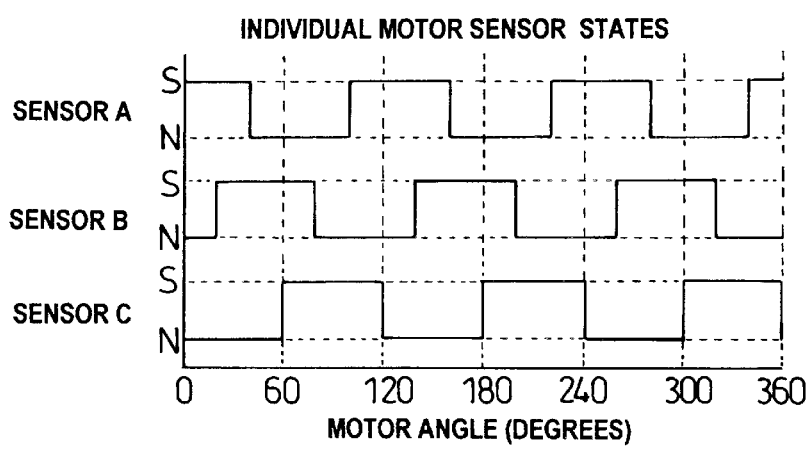
FIG. 5 is a graph depicting the output from each of the three sensors shown in FIG. 4 over a complete revolution of the motor rotor.
Figure 6:
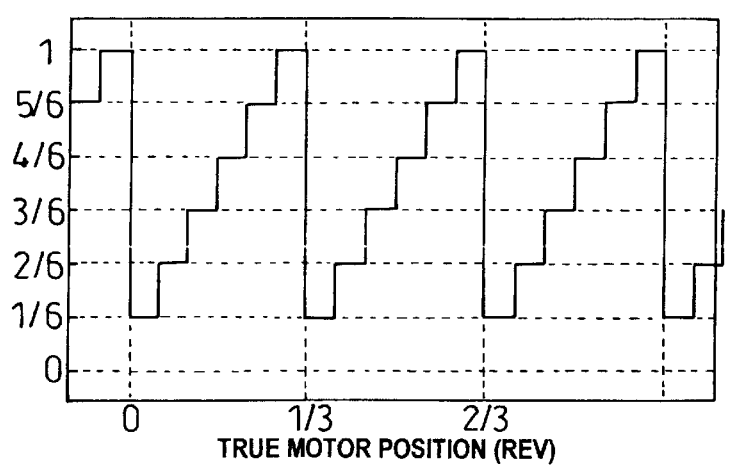
FIG. 6 is a graph illustrating a typical output signal which can be constructed from the three signals of FIG. 5.

The three individual sensor signals can be combined to give a signal that (in the case of a 3-phase motor with 6 rotor poles) repeats every 120° of motor rotation; this is shown in FIG. 5. Other numbers of phases and/or rotor poles can be used. The key point to note is that the motor angle that is measured is "absolute" (in that it does not require indexing and counting) but it is not unique within a motor revolution. Therefore the motor angle signal is not an index pulse nor a "continuous" signal but consists of a relatively small number of discrete angle measurements that occur more than once per motor revolution. FIG. 6 shows an example in which the individual motor angle signals are converted into a single combined signal with 6 states ranging from ⅙ to 1 in steps of ⅙. The figure shows the discrete nature and higher frequency of the motor angle signal.

It will also be appreciated that the torque sensor and position sensor may be combined as a single sensor. Indeed, a single multi-purpose output signal may be produced by the sensor from which a torque value and an angular position value can be extracted.

All the systems described hereinafter as examples rely on the non-integer ratio of the gearbox to produce a "beat" frequency between the outputs of the two sensors from which a measurement of the angular position of the steering shaft can be detected over a range greater than can be achieved using a single sensor on its own. They differ principally in the choice of sensors used, and the process used to calculate the angular position.

Method 1—Absolute Angle Sensor on Motor Shaft and Index on Column Shaft

In this case an angular position sensor on the column measures the angle of the steering column at one particular point in its revolution—i.e. an index signal is generated when the column angle lies in a small range of angles. The angular position sensor is ideally situated close to the EPAS gearbox so that the measurement is not affected by any compliance (e.g. in the torque sensor). A second angular position sensor measures the absolute angle of the motor over a fall revolution.

The motor is geared to the column via a reduction gearbox which has a non-integer ratio. That is, the motor turns through p/q revolutions for each revolution of the column where p and q are integers such that:

$$q < 1$$

and $$p > q \quad \text{(i.e. motor rotates faster than column)}$$

and $$gcd(p, q) = 1 \quad (\text{``}gcd\text{''} = \text{``greatest common divider''})$$

For example, for a gear ratio of 34:10, we have p=17 and q=5 giving 17/5=34/10 with all of the conditions met. If these conditions are met it is possible to measure the number of revolutions of the column using a system in accordance with the invention. This is achieved by using the non-integer relationship between the two angle measurements.

For illustrative purposes assume that the column shaft is at an angle where the column sensor detects the index pulse and the motor is rotationally positioned so that the motor angle sensor gives a reading of "zero". If the column is rotated by one full revolution then the column sensor will again detect the index but the motor will rotate through p/q revolutions. The motor angle measurement cannot accumulate all of the motor revolutions but will indicate the fraction of a revolution given by:

$$(p-nq)/q$$

where n is the integer that gives $$0 \leq (p-nq)/q < 1$$

i.e. so that the motor angle measurement is in the range of the sensor output.

After r revolutions of the column, the motor will have rotated through (rp)/q revolutions and the motor angle sensor output will be;

$$(rp-n\ q)/q$$

where n is a (different) integer chosen so that $$0 \leq (rp-nq)/q < 1$$

When r=q, then n=p and the motor angle measurement will be zero. Therefore after q revolutions, the motor and column sensor outputs will assume the same relationship that they started in. For any further revolutions after this the pattern will repeat Thus the motor angle when the column passes through its index point will vary as the column makes complete revolutions. This can be illustrated by an example. Taking p=17 and q=5 the values for each column revolution are given in table 1.

table 1. The input to the look-up table is row 5 of table 1 and the output of the look-up table is row 1 of table 1. If the column and motor angles are not synchronised at zero, the look-up table must take this into account or an offset should be added to the motor angle.

Figure 7:
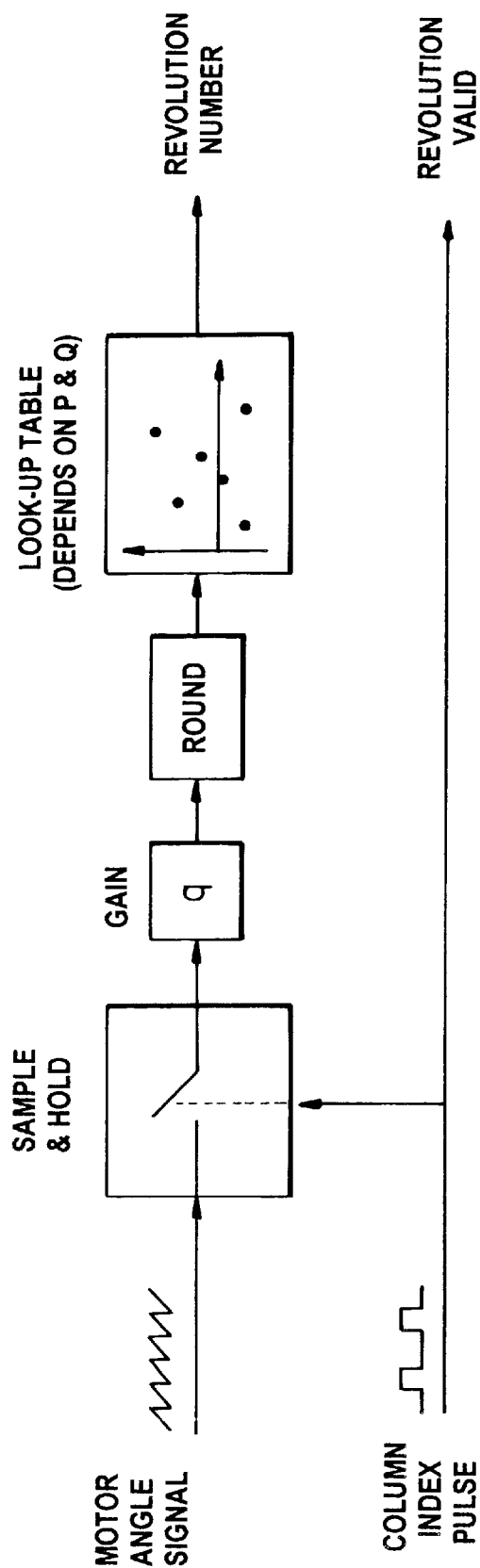
FIG. 7 illustrates one example for combining the output of the two sensors of the system of FIG. 1 to produce a revolution number signal.
Figure 8:
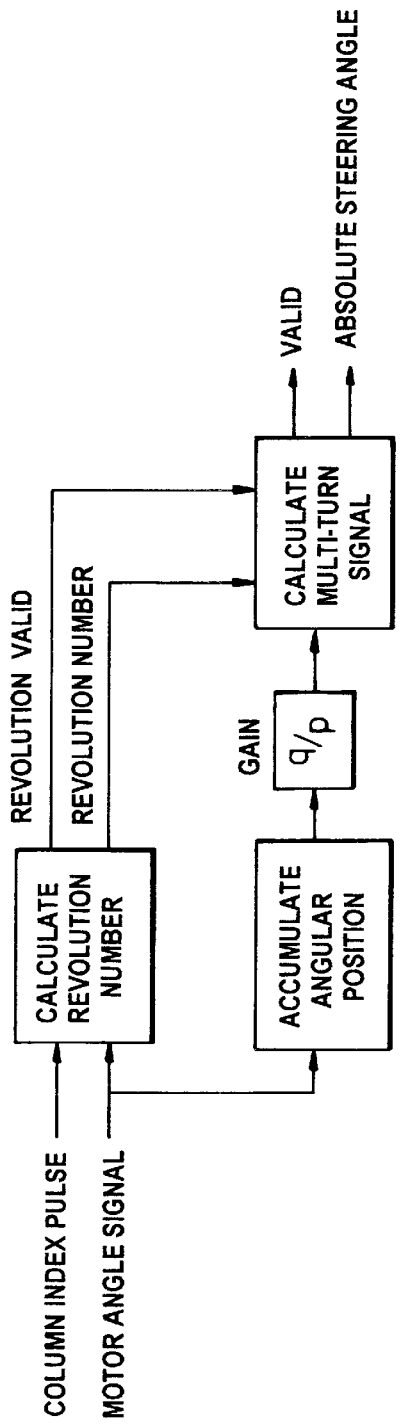
FIG. 8 illustrates a refinement to the scheme of FIG. 7.
Figure 18:
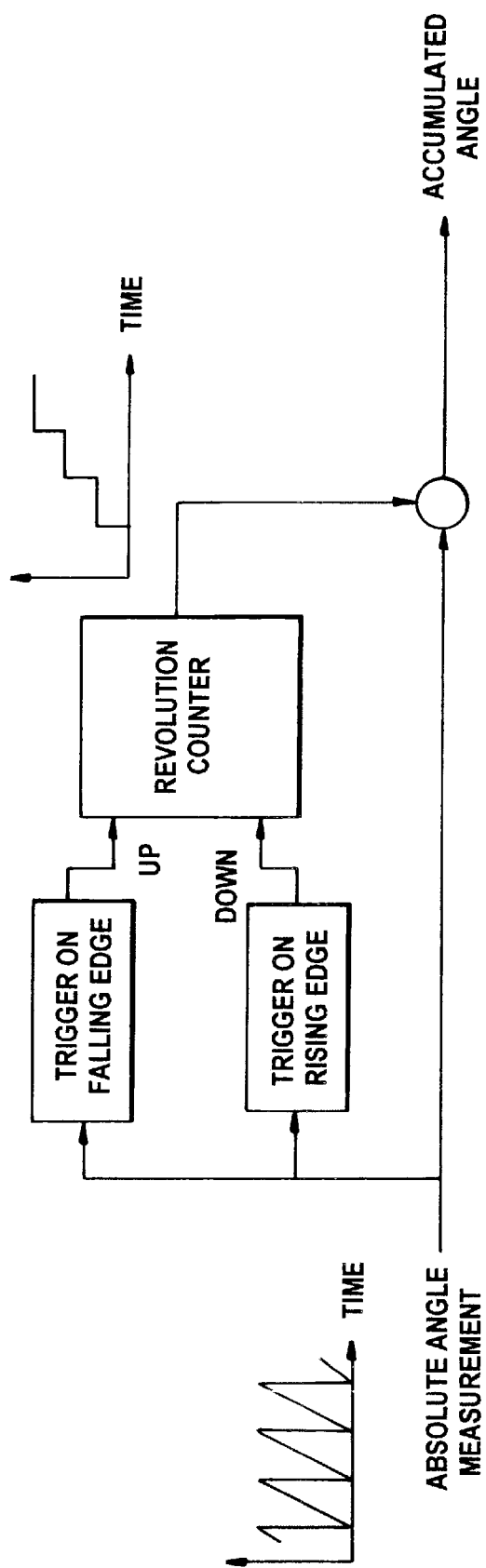
FIG. 18 is a schematic block diagram of a method for accumulating angular position from the absolute angle sensor output.
Figure 19:
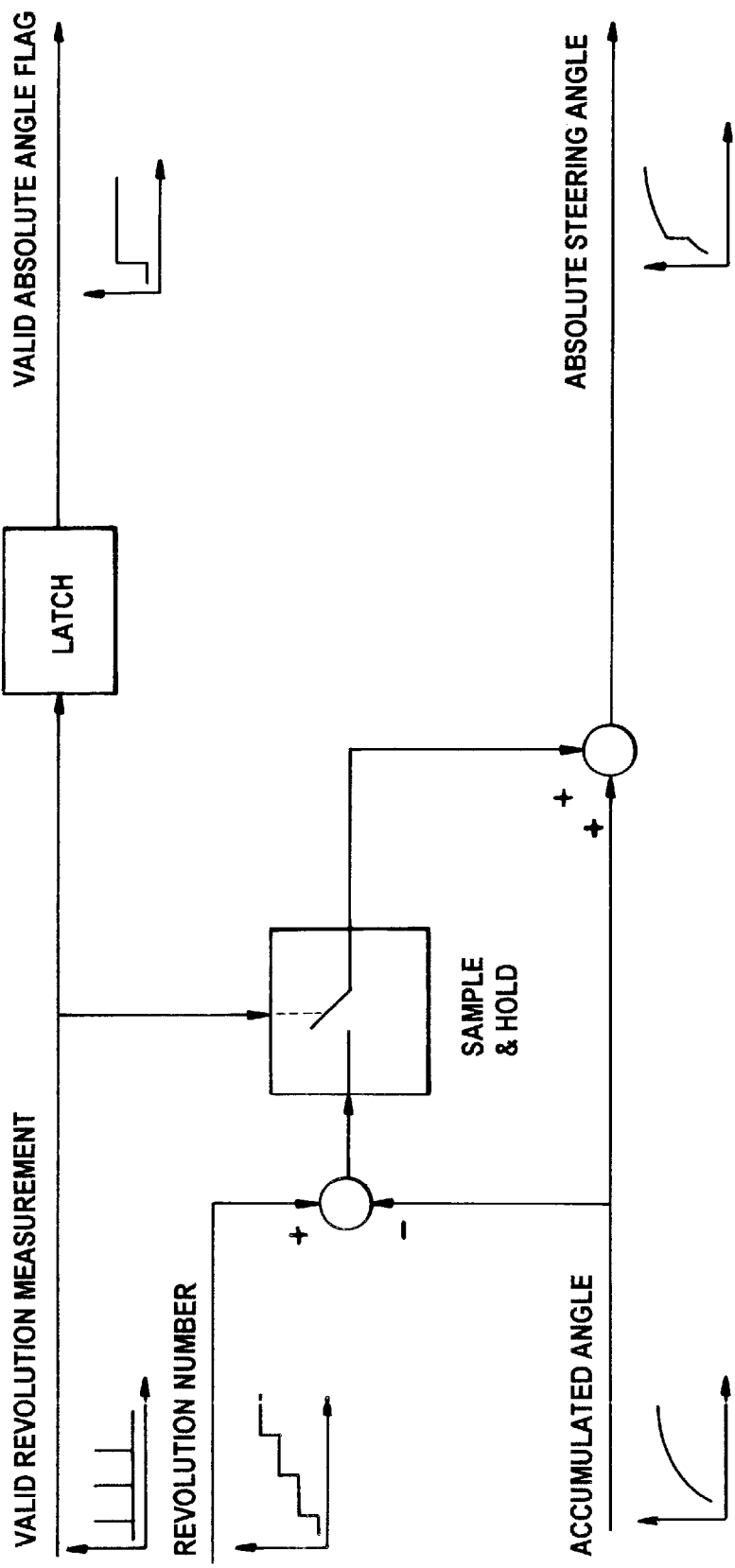
FIG. 19 is a further schematic block diagram showing elements to combine the accumulated angular position signal with the revolution count to generate an absolute steering angle measurement.

FIG. 8 shows a refinement in which the system of FIG. 7 is combined with an accumulate angular position block shown in FIG. 18 and a calculate multi-turn signal block shown in FIG. 19 to generate the steer angle signal. The motor angle measurement is accumulated and then scaled by the gearbox ratio (q/p) to convert it into units of column revolutions. The revolution number is calculated by the scheme shown in FIG. 7 and the outputs of these blocks are fed into the calculate multi-turn signal block.

The accumulate angular position block may thus be implemented in the manner shown in FIG. 18. Two triggers are provided, a first one of which triggers on the trailing edge of the output from the absolute position sensor and second one of which triggers on the rising edge. When the first one triggers, a count up signal is generated which causes the value stored in a revolution counter to be incremented. Likewise, when the second one triggers, a count down signal is generated and the value in the revolution counter is decremented. Thus, the revolution counter value corresponds to the number of complete cycles of the absolute position sensor output from its arbitrary zero position The calculate multi-turn signal block lay be implemented as shown in FIG. 19. A signal indicating the number of revolutions of the shaft (such as can be derived from the steps set out in FIG. 18) is combined with the accumulated angle signal. Since the revolution number is only valid at one particular angle of the shaft, a "valid revolution mea-

TABLE 1

Example with p = 17 and q = 5

| Column revolutions = r | -3 | -2 | -1 | 0 | 1 | 2 | 3 | 4 | 5 | 6 |
|---|---|---|---|---|---|---|---|---|---|---|
| Number of motor = rp/q revolutions | -51/5 | -34/5 | -17/5 | 0 | 17/5 | 34/5 | 51/5 | 68/5 | 85/5 | 102/5 |
| Number of complete = n motor revolutions | -11 | -7 | -4 | 0 | 3 | 6 | 10 | 13 | 17 | 20 |
| Motor position sensor = (rp - nq)/q measurement | 4/5 | 1/5 | 3/5 | 0 | 2/5 | 4/5 | 1/5 | 3/5 | 0 | 2/5 |
| Number of 1/q = (rp - nq) | 4 | 1 | 3 | 0 | 2 | 4 | 6 | 8 | 10 | 12 |

Table 1 shows that the motor angle measurement can be used to uniquely identify column revolutions from −2 revolutions to +2 revolutions with the pattern repeating after 5 revolutions. Thus the absolute angular position of the steering column can be identified over a number of revolutions and hence the absolute steering angle can be obtained.

FIG. 7 shows a scheme for using a column index pulse with information from the motor angle sensor to generate a revolution number signal by combining the measurements from a column index sensor and a motor absolute angle sensor. The operation of the blocks is described below:
Sample & hold
    Captures the motor angle whenever the column index pulse is present.
Gain
    Multiplies sampled motor angle by q.
Round
    Rounds the input to the nearest whole number.
Offset look-up
    Looks up the number of column revolutions away from centre for the sampled motor angle using a table like surement flag" is provided to indicate when the revolution number signal is valid and trigger a sample and hold block that is used to store any offset needed to correct the accumulated angle value. A latch can be used to generate an "absolute angle valid" flag when the first valid revolution number is received.

Measures to reduce the sensitivity to noise, manufacturing tolerances, gearbox backlash, compliance or offsets in the sensors have not been described. These are omitted for clarity but any practical implementation would have to be made tolerant of noise and timing issues (such as allowing the looked-up offset to stabilise before sampling it).

The processing of the output signals can be implemented by using either electronics hardware or a software program running in a microcontroller or by a combination of the two. If the scheme is implemented in software, then the sample rate of the software should be selected to avoid aliasing of the signals and provision must be made to give a rapid response to the column index pulse.

The absolute steering angle will not be valid until a column index pulse has been generated by the column movement. If an indexed incremental sensor is used the absolute steering angle measurement will not be valid until both the column and the motor sensor have been indexed.

The resolution of the steering angle measurement will depend on the resolution of the motor sensor: if the sensor can resolve 1 degree on the motor shaft then q/p degrees of column movement can be resolved. The accuracy will depend on the accuracy of the motor angle sensor and the arc-width of the column index pulse: if the column index pulse width is 5 degrees "wide" then the steering angle measurement can determined to within 5 degrees provided the motor sensor is accurate to better than 5 p/q degrees. The motor angle sensor must have sufficient resolution and accuracy to allow the differences in motor angle at each column revolution to be resolved. That is, the motor angle sensor must be able to resolve q different angles to an accuracy of better than ±q/2.

Therefore, in this example, a motor angle sensor with a resolution of just 5 different angles could provide a steering angle signal. The disadvantage of using such a coarse resolution is that the column angle would only be resolved to 85 different angles in a revolution.

Method 2—Absolute Angle Sensor on Column Shaft and Index on Motor Shaft

In this case an angular position sensor on the column measures the angle of the steering column within each revolution. A second angular position sensor measures the angle of the motor at one particular point in its revolution—i.e. an index pulse is generated when the motor passes some datum.

As before, the motor is geared to the column via a reduction gearbox with a non-integer ratio of p/q where p and q are integers such that:

$$q>1$$

and $$p>q$$

and $$gcd(p,q)=1$$

Assume that the system is positioned so that when the column is on the straight-ahead revolution the column angle measurement reads "zero" and the motor index pulse is active. In practice it will be difficult to exactly align the column zero position and the motor index pulse and so provision for offsets away from this condition should be made. As the column and motor rotate, the motor sensor will generate an index pulse on every revolution of the motor shaft. When the index pulse occurs, the column angle will be $$mq/p$$

where m is the number of complete revolutions the motor has made (thus m is an unknown integer). The column angle measurement will be given as $$c=mq/p-r$$

where c is the column sensor output in revolutions and r is the number of complete revolutions that the column has made. The column sensor output is constrained to lie between 0 and 1 revolution:

$$0 \leq c < 1$$

Thus the value of c at each motor index pulse is determined by the number of motor revolutions (m) and the number of column revolutions (r) which are both unknown integers. We wish to find the value of r so that the steer angle can be determined. The value of r can be found from the remainder after an integer number of q/p are subtracted from c. Let d be the remainder and s be an integer. Then $$d=c-sq/p$$

where d is constrained to be in the range $$0 \leq d < q/p.$$

Then substituting the equation for c gives:

$$d = c - sq/p$$
$$= mq/p - r - sq/p$$
$$= (m-s)q/p - r$$

so that integer s will cancel out the unknown integer m as well as part of r to allow d to take on values of 0 to (q−1)/q in steps of 1/q. Therefore d can have one of q different unique values. These values will correspond to different values of r. For each particular set of different values of q and p the design must be checked to ensure that there is a one-to-one relationship between the remainder, d, and the revolution number, r, as illustrated by the following example.

Make p=17 and q=5. FIG. 20 is a table which shows the values that arise as the motor rotates.

The table in FIG. 20 shows that the combination of steering shaft angle and motor index pulse can be used to uniquely identify steering shaft revolutions from −2 to +2 revolutions by looking up r against p×d. The identified number of revolutions can be added to the measured steering shaft angle to allow a steering angle position to be determined.

Figure 9:
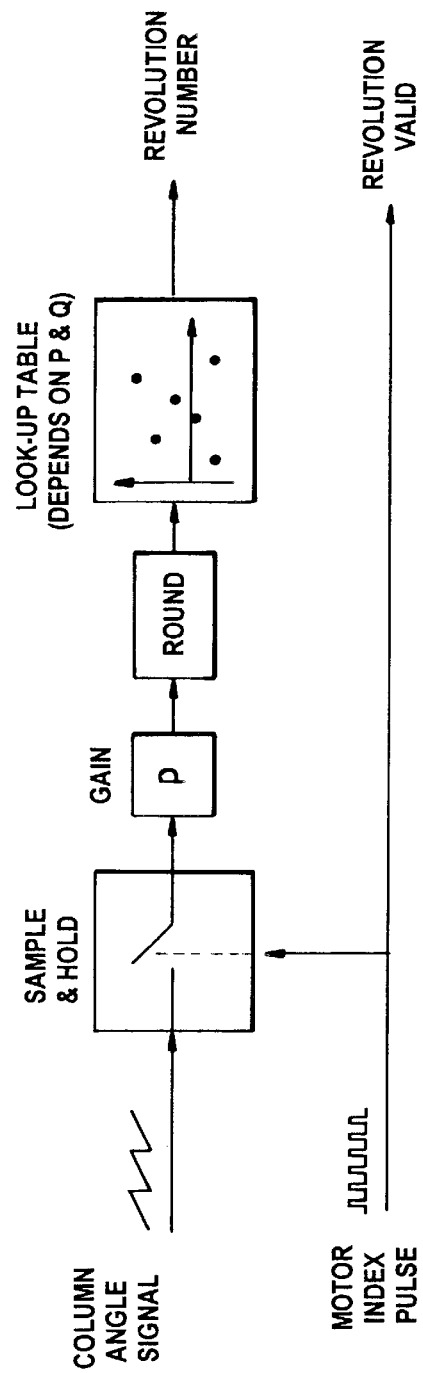
FIG. 9 shows a scheme for using a motor index signal with information from a steering shaft sensor to produce an absolute steering angle signal.

FIG. 9 shows a scheme for using a motor index pulse with information from the steering shaft angle sensor to generate an absolute steering angle signal. The steering shaft angle sensor is assumed to produce a normalised angle measurement that varies from 0 to 1. The operation of the blocks is described below:

Sample & hold
　Captures the steering shaft angle whenever the motor index pulse is present.
Gain
　Multiplies the captured steering shaft angle by p.
Rounding block
　Rounds the input to the nearest integer to calculate the index to the look-up table.
Revolution look-up
　Looks up the steering shaft revolution from a table. For example, the table in FIG. 2 shows the relationship between the overall steering shaft angle and the angle measured by the steering shaft sensor when the motor index is valid. The look-up table can be constructed from rows 2 and 4 of the table in FIG. 20. Table 3 shows an example of the look-up table for the example of p=17 and q=5. This is row 4 and row 2 of table 2. The look-up index is an integer that can vary between 0 and p. The look-up table output is the bottom row of table 3 multiplied by q/p (for example, with an input of 3, the output is 4×5/17=20/17). Note that 2 possible outputs are shown for inputs of 11 and 16. These are the values where the output "wraps" around. Either the positive or negative output must be chosen when the system is calibrated. The choice of the value will depend on the offsets that are used between the motor and steering shaft angle sensors. If the negative values are chosen, then the look-up table will output a number between $-40_./17$ and $40/17$ revolutions i.e. ±2.353 revolutions. If the steering shaft moves outside this range the output will "wrap" to an incorrect value.

If the shaft and motor angles are not synchronised at zero, the table must take this into account or a suitable offset must be added to the steering shaft angle signal.

TABLE 3

Example of look-up table for p = 17 and q = 5

| Row 4 × p | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Row 2 × p/q | 0 | 7 | -3 | 4 | -6 | 1 | 8 | -2 | 5 | -5 | 2 | -8 or 9 | -1 | 6 | -4 | 3 | -7 or 10 | 0 |

Figure 10:
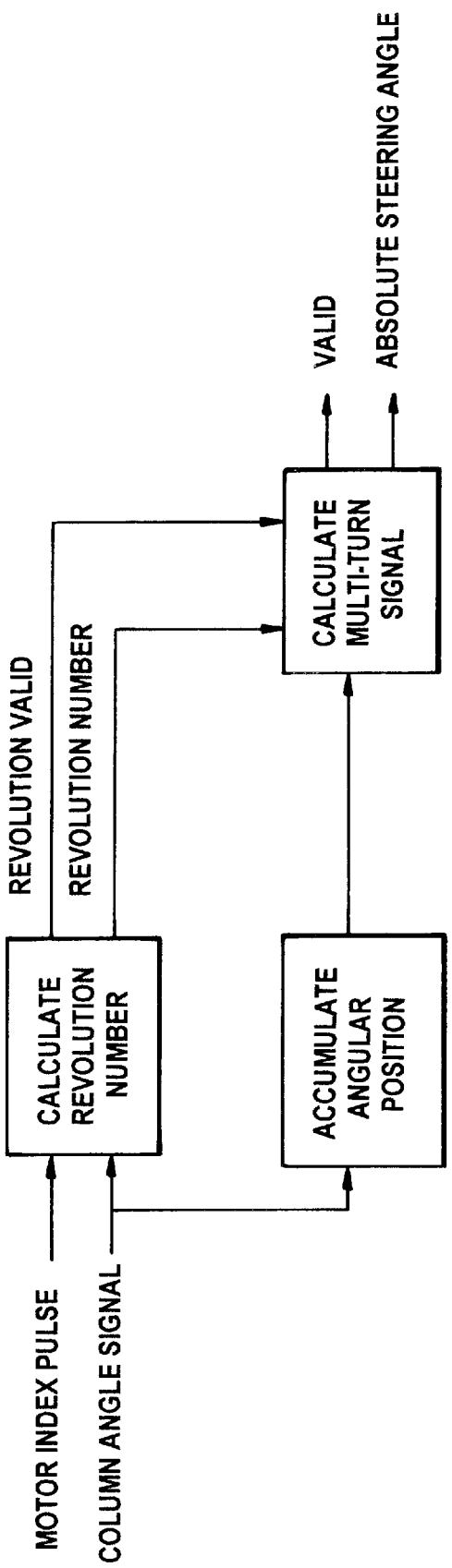
FIG. 10 shows how the scheme of FIG. 9 can be adapted to produce a steering angle signal.

FIG. 10 shows how the scheme in FIG. 9 is combined with the accumulate angular position block and the calculate multi-turn signal block to generate the steer angle signal. The column angle measurement is accumulated. The revolution reference is calculated by the scheme shown in FIG. 9 and the outputs of these blocks are fed into the multi-turn block.

Figure 11:
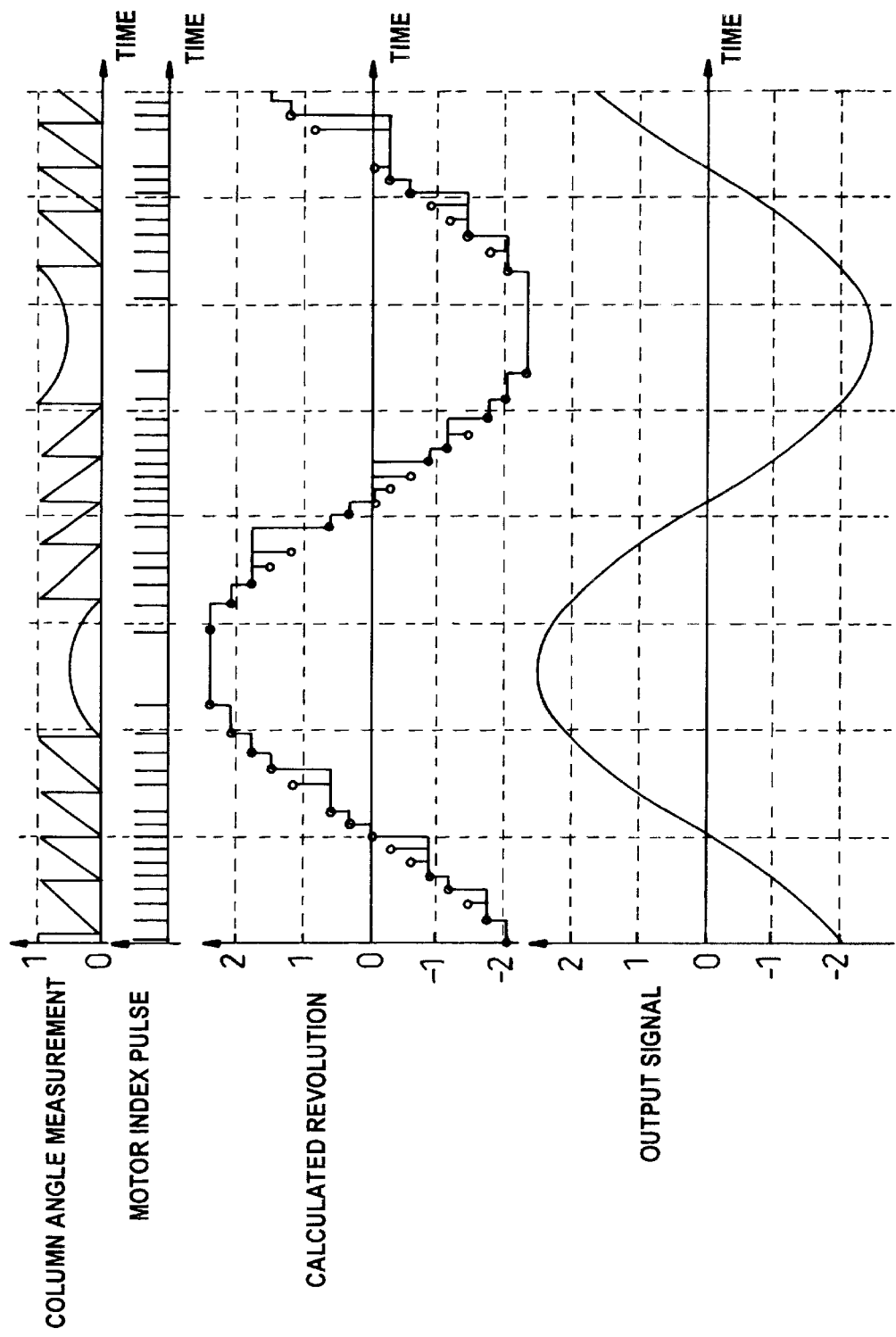
FIG. 11 shows representative waveforms produced using the scheme of FIG. 9.

The absolute steering angle will not be valid until a motor index pulse has been generated. If an indexed incremental sensor is used, the absolute steering angle measurement will not be valid until both the column and the motor sensor have been indexed. Some results from this scheme are shown in FIG. 11. With the scheme shown the revolution number is updated on every index pulse. The complete scheme could use the repeated updates to check for errors and inconsistencies and to ensure the robustness of the measurement system.

The resolution of the steering angle measurement will depend on the resolution of the column sensor. The accuracy will depend on the "arc width" of the motor index pulse: if the motor index pulse width is 5 degrees "wide" then the steering angle measurement can determined to within $5q/p$ degrees. The column sensor must have sufficient resolution and accuracy to allow the differences in angle at each motor revolution to be resolved. Therefore it must be able to resolve p different angles to an accuracy of better than ±p/2.

Method 3: Motor Indexing>1 Per Rev

The case described above can be extended to cover a sensor that generates more than one pulse per motor revolution. Assume that a pulse that occurs part-way through a revolution cannot be distinguished from a pulse at the start of the revolution and that k equally-spaced pulses occur per revolution. Then there will be k p/q motor pulses per revolution of the column. For certain values of k, p and q it will be possible to use the same approach as described above by substituting k×p for p.

Method 4: Continuous Column and Motor Angle Sensor Measurement

An alternative system can be constructed which uses 2 sensors that give an output at all angles of the column and motor. These sensors can either measure absolute angle or can incrementally measure angle and count the number of pulses past an index mark. With angular position sensors on both the column and motor, it is not necessary to wait for the steering to be rotated past an index pulse in order to identify the revolution of the column (unless incremental sensors are used, in which case it is necessary to wait for the first index pulse on each sensor) and the revolution can be calculated at more frequent intervals giving better immunity to noise and out-of-tolerance components.

The motor is geared to the column via a reduction gearbox with a non-integer ratio of p/q where p and q are integers as described above.

Let the actual column angle be:

$$c+r$$

where c is the angle within the revolution (i.e. $0<c\leq 1$) and r is the integer number of complete revolutions away from some reference angle. The column sensor will measure the angle c. The motor rotates with the column via the gearbox. If there is no backlash or compliance in the gearbox the motor angle will be given by:

$$(c+r)p/q$$

The motor sensor will measure the angular position of the motor shaft within the revolution so the sensor output can be expressed as $$m=(c+r)p/q-w$$

where w is an integer that is a whole number of revolutions so that $0\leq m<1$. The 2 measurements of column and motor shaft angles can be processed to give the revolution number. One method to do this is to calculate a "prediction" of the motor angle from the measured column angle assuming that the steering system is on the "zero" revolution (the prediction will only be correct when the column and motor are aligned on the zero steering revolution. the error of the prediction is used to derive the revolution number).

The prediction is calculated using the gearbox ratio:

$$\text{prediction}=cp/q$$

The difference between the measured motor angle and the predicted motor angle is $$d = m - \text{prediction}$$
$$= (c+r)p/q - w - cp/q$$
$$= rp/q - w$$

Recall that r, w, p and q are integers so taking the residue of d will give a number that has values of 0 to (q−1)/q in steps of 1/q.

An alternative way of looking at this is to use modular arithmetic. For example, mod-1 arithmetic gives the following results:

| x | $x_{(\text{mod } 1)}$ |
|---|---|
| 1.0 → | 0.0 |
| 1.2 → | 0.2 |
| 3.456 → | 0.456 |
| −1.2 → | 0.2 |

| Number of complete revolutions: | r | where γ is an integer |
| Actual column angle: C = c + r | | where 0 < c < 1 |

The column sensor will measure the angle:

$$c=C_{(\text{mod } 1)}$$

The motor angle will be:

$$M=(c+r)p/q$$

The motor sensor will measure:

$$m=M_{(mod\ 1)}$$

The prediction of the motor angle:

$$\text{prediction } cp/q$$

The difference is:

$$d=m-\text{prediction}=\{(c+r)p/q\}_{(mod\ 1)}-cp/q$$

The residue of the difference is:

$$d_{(mod1)} = [\{(c+r)p/q\}_{(mod1)} - cp/q]$$
$$= \{cp/q\}_{(mod1)} + \{rp/q\}_{(mod1)} - \{cp/q\}_{(mod1)}$$
$$= \{rp/q\}_{(mod1)}$$
$$= (1/q)\{r/p\}_{(mod\ q)}$$

Thus:

$$L=qd_{(mod\ 1)}=\{rp\}_{(mod\ q)}$$

Therefore the revolution number can be calculated from L. Clearly, due to the (mod q) arithmetic, L can only take on q different values so there are q different recognisable values of r.

Figure 12:
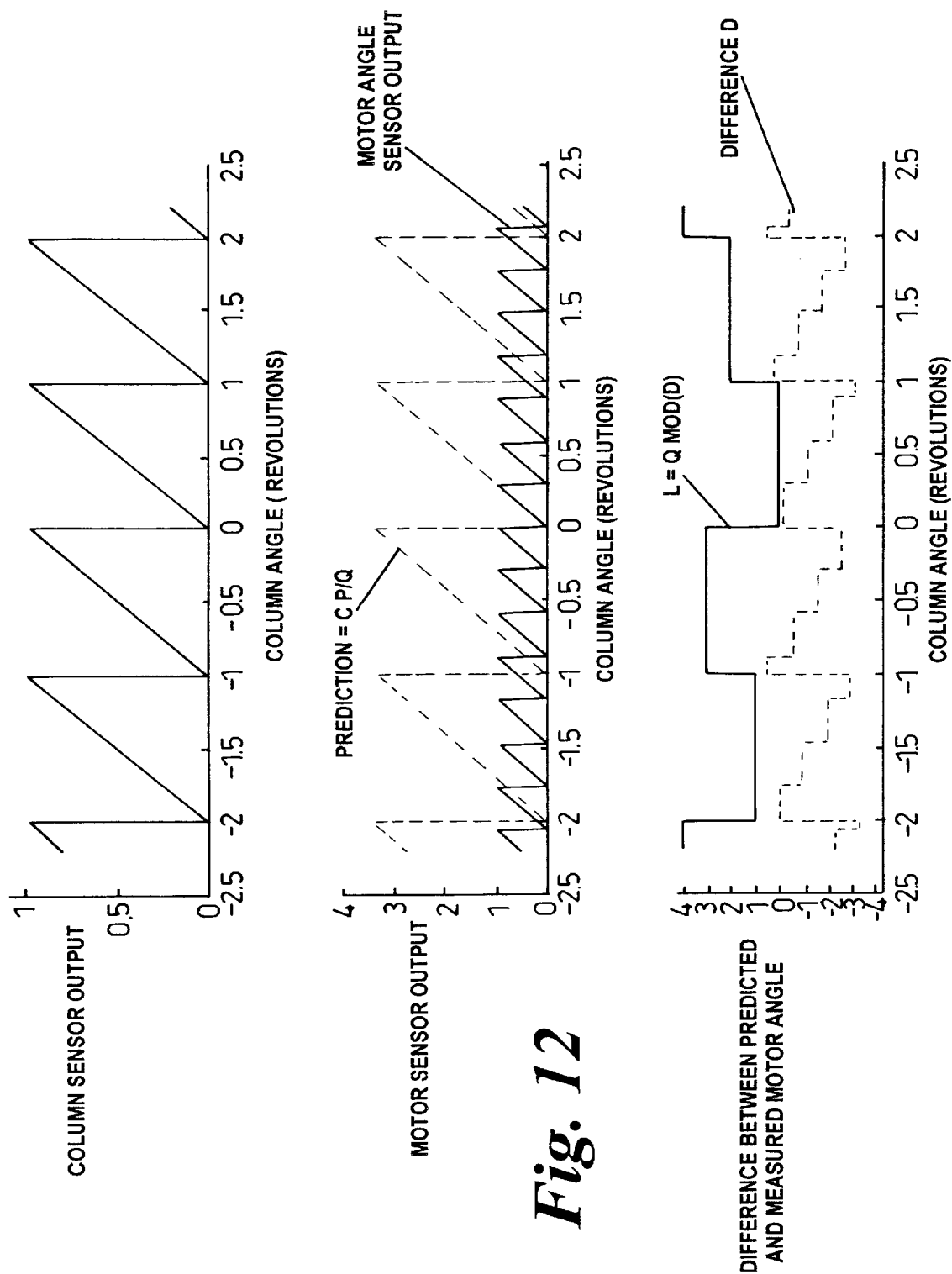
FIG. 12 illustrates output waveforms produced by a system in which both the steering shaft sensor and motor rotor sensor comprise absolute position sensors.

FIG. 12 shows the results from an example using ideal components with no gearbox backlash or compliance. The values of p=17 and q=5 have been used. The top plot shows the measured column angle against the actual column angle. The second plot shows the measured motor angle (solid line) and the "predicted" motor angle obtained by multiplying the measured column angle by p/q. The third plot shows the difference (d) between the 2 signals in the second plot (dashed line) and the (mod 1) residue of the difference multiplied by q (i.e. L); it can be seen that the residue is always an integer multiple of I/q. The relationship between L and the number of complete column revolutions is clear. There are q different values which the difference can take. In this case, there are 5 levels so the 2 revolutions either side of the straight ahead position can be uniquely identified. It has been assumed that the motor and column angle measurements are aligned at zero; if this is not the case then offsets should be taken into account.

Figure 13:
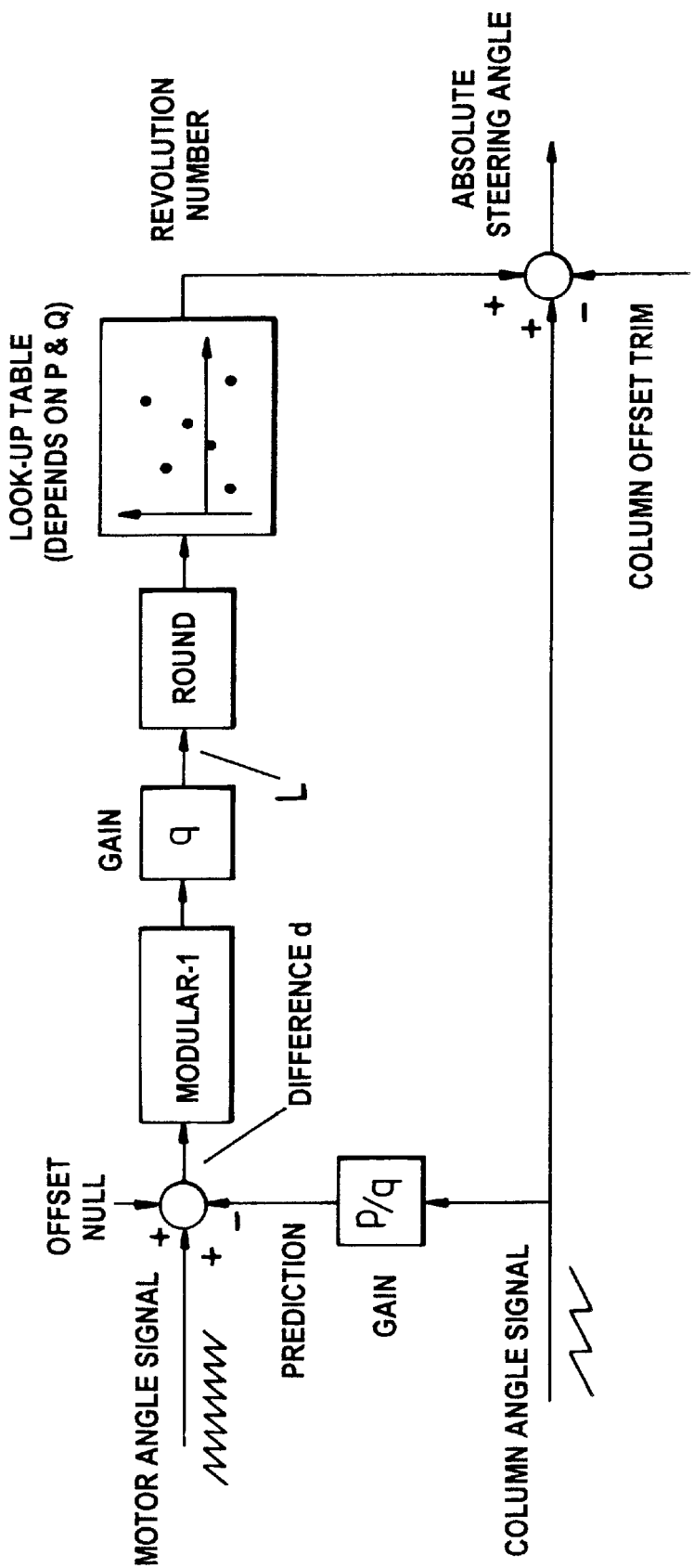
FIG. 13 is a block diagram of a scheme for producing the waveforms shown in FIG. 12.

FIG. 13 shows a block diagram of a scheme that implements the processing described above. The inputs to this block diagram are a column angle measurement and a motor angle measurement. Both of these quantities are obtained using sensors of the absolute angle type described above. The operation of the blocks is described below:

Gain
Multiplies the column angle by p/g to give the "predicted" motor angle.

Calculate difference
A summing block is used to calculate the difference, d, between the measured motor angle and the predicted motor angle. An offset can be introduced to this sum to compensate for the misalignment of the motor and column sensors.

Modular-1
Calculates the residue of the difference, d, as described above.

Gain
Multiplies the residue of the difference by q to give L.

Round
Rounds L to the nearest integer. This integer is used as an index for the look-up table. In ideal circumstances the fractional part of the difference will be exactly an integer factor of 1/q. The rounding operation is necessary to compensate for non-ideal effects that can distort the measurements and the calculations. The rounding operation gives a good immunity to small errors. The exact immunity should be calculated for a given set of p and q and then assessed against the performance achievable by the chosen sensors.

Look-up table
Looks-up, the revolution number using the index. The contents of the look-up table will depend on the values of p and q. The look-up table can be calculated in this case by considering the values of the inputs and intermediate variables for each column revolution. Table 4 gives an example for p=17 and q=5. The first row of table 4 is the column revolution number. The bottom row of table 4 is the look-up index. It is assumed that the column revolutions of interest are those given in the unshaded areas of table 4. The look-up table must output the top row of table 4 against the index given in the bottom row of table 4.

TABLE 4

Example with p = 17 and q = 5

| Column revolutions = r | -3 | -2 | -1 | 0 | 1 | 2 | 3 | 4 | 5 | 6 |
|---|---|---|---|---|---|---|---|---|---|---|
| Column sensor output -c | 0 | 0 | 0 | 0 | 0 | 0 | 0 | 0 | 0 | 0 |
| Number of motor revolutions = (c + r) p/q | -51/5 | -34/5 | -17/5 | 0 | 17/5 | 34/5 | 51/5 | 68/5 | 85/5 | 102/5 |
| Number of n motor revolutions = w | -11 | -7 | -4 | 0 | 3 | 6 | 10 | 13 | 17 | 20 |
| Motor angle sensor output = m | 4/5 | 1/5 | 3/5 | 0 | 2/5 | 4/5 | 1/5 | 3/5 | 0 | 2/5 |
| Prediction P = cp/q | 0 | 0 | 0 | 0 | 0 | 0 | 0 | 0 | 0 | 0 |
| Difference d = m - P | 4/5 | 1/5 | 3/5 | 0 | 2/5 | 4/5 | 1/5 | 3/5 | 0 | 2/5 |
| Number of 1/q (look-up index) = (rp - wq) | 4 | 1 | 3 | 0 | 2 | 4 | 6 | 8 | 10 | 12 |

Sum
   Adds the revolution number to the column angle measurement to give the steering angle.

This scheme shows the fundamental elements that are required. Additional components may be included to compensate for offsets, gearbox backlash, initialisation, error detection and any issues associated with the sensors that are used. It is assumed that these components can be designed by someone who is skilled in the art from this teaching.

Method 5: Non-unique Motor Angle

The schemes described above can be adapted to work with a brushless motor sensor arrangement. There is an obvious difference in that the frequency of the signal is higher and does not represent a unique motor angle within a complete mechanical revolution of the motor shaft. This difference can be accommodated by considering the ratio between the motor sensor and the column sensor rather than the ratio between the motor and the column. Thus, if the sensor signal repeats n times per column revolution, then the ratio between the motor sensor and the column is:

$$np/q$$

where p and q are as before. To be able to measure the column revolution, we must ensure that:

$$np > q$$

and $$\gcd(np, q) = 1$$

If these conditions are satisfied then the non-unique nature of the motor sensor can be tolerated. The calculations that are used must be modified to incorporate the factor of "n". Using modular arithmetic, we have:

Actual column angle: $C = c + r$ where $0 < c < 1$ and r is an integer

| | |
|---|---|
| The column sensor will measure the angle: | $c = C_{(\text{mod } 1)}$ |
| The motor angle will be: | $M = (c + r)\, n\, p\, /\, q$ |
| The motor sensor will measure: | $m = M_{(\text{mod } 1)}$ |
| The prediction of the motor angle: | prediction $= c\, n\, p\, /\, q = (n\, p\, /\, q)\, C_{(\text{mod } 1)}$ |

The difference is:

$$d = m - \text{prediction} = \{(c+r)n\,p/q\}_{(\text{mod } 1)} - cnp/q$$

The residue of the difference is:

$$d_{(\text{mod}1)} = [\{(c+r)np/q + e\}_{(\text{mod}1)} - cnp/q]_{(\text{mod}1)}$$
$$= \{cnp/q\}_{(\text{mod}1)} + ((rnp/q))_{(\text{mod}1)} - \{cnp/q\}_{(\text{mod}1)}$$
$$= \{rnp/q\}_{(\text{mod}1)}$$
$$= (1/q)\{rnp\}_{(\text{mod}q)}$$

Thus:

$$L = qd_{(\text{mod } 1)} = \{rnp\}_{(\text{mod } q)}$$

Therefore the revolution number can be calculated from L as with the complete motor revolution sensor.

A further complication is that the brushless motor sensor has a very coarse resolution with large quantisation errors. In the example given above the sensor can resolve 6 different angles within a cycle that repeats 3 times per motor revolution. Thus, in this case, n is 3. The coarse resolution can be dealt with in a number of ways. The essence is to recognise that the motor angle sensor measurement is only accurate at points that are close to the transition from one sensor state to another. This can be achieved by:

a. Running the calculations at the time of a transition in the motor angle sensor state by explicitly recognising the transition. The transition between 2 motor angle states gives a higher resolution angle measurement than the sensor state itself.

b. Using knowledge of the motor velocity and the time since the last motor angle sensor transition to improve the motor angle measurement.

c. Using a filter to exclude the motor angle sensor results that are poorly correlated with the column angle sensor measurements.

d. Some combination of the methods given above.

Figure 14:
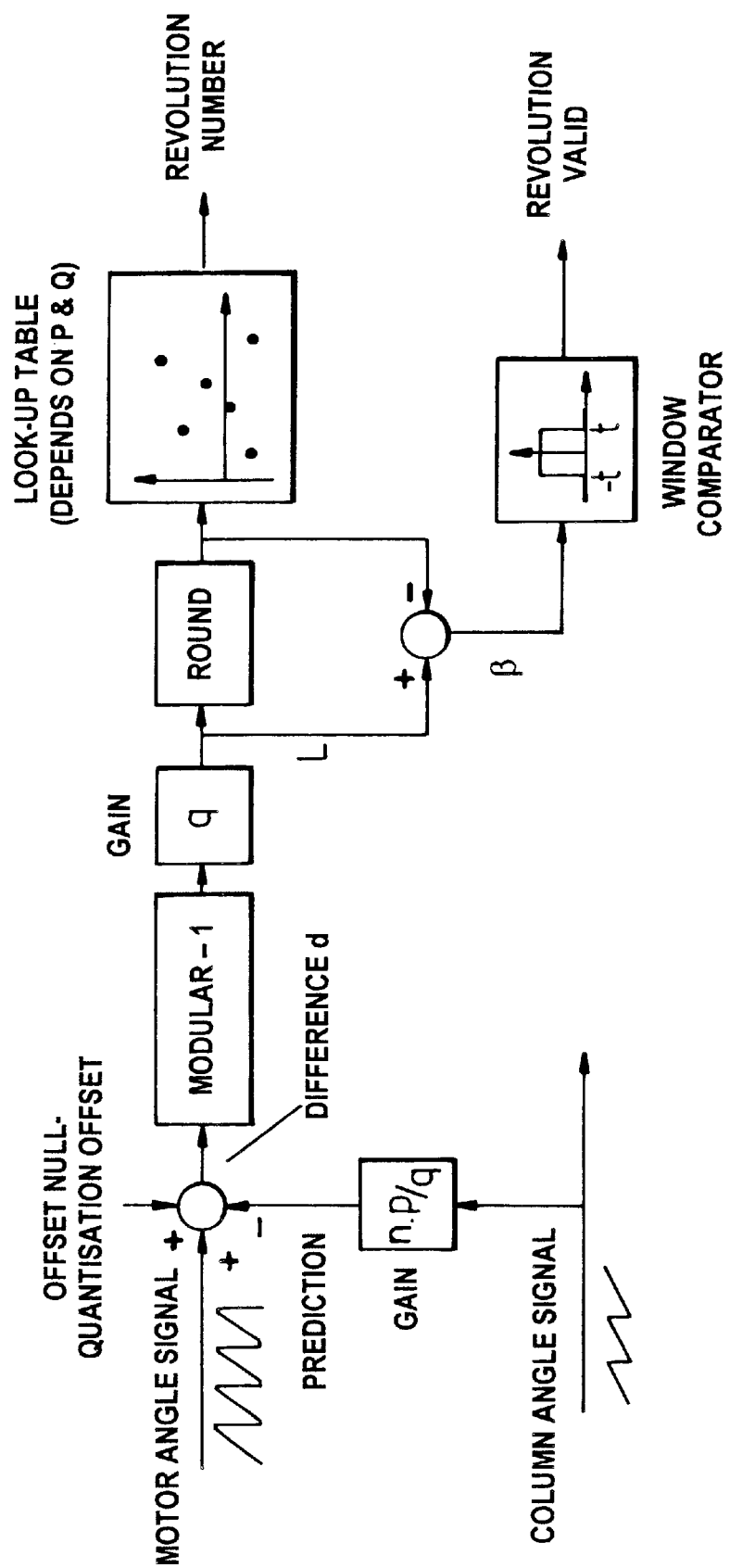
FIG. 14 is a block diagram of an alternative processing scheme implemented in an electric power assisted steering system in accordance with the present invention.
Figure 15:
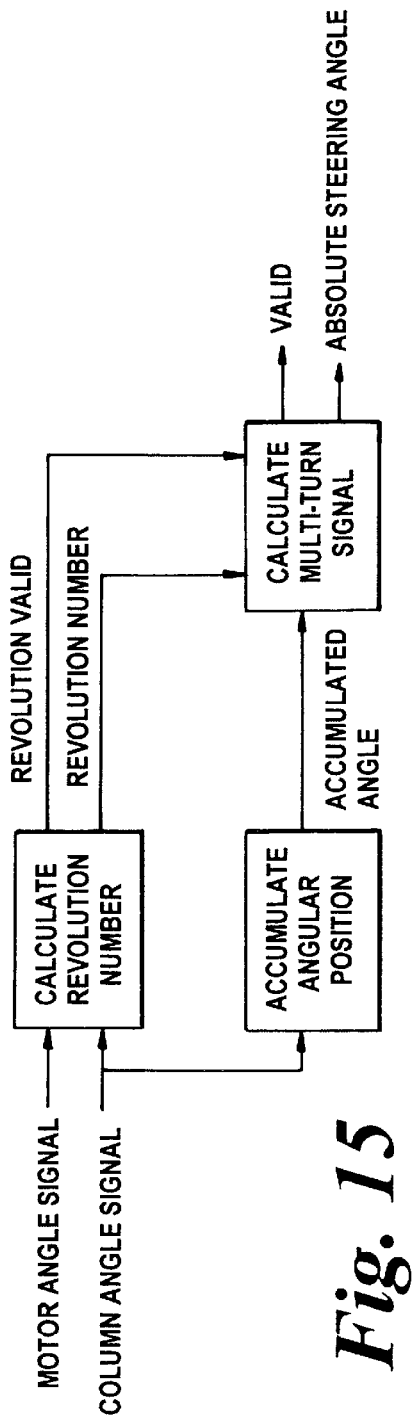
FIG. 15 is an alternate block diagram for the system of FIG. 14.

A system adapted to work with these sensors is shown in FIG. 14 and FIG. 15. This uses a simple filter that will only accept motor angle sensor measurements that are well correlated with the column angle measurements. The difference between L and round(L) is used as an "error" signal. When the difference is small, the motor angle sensor output is close to an "ideal" sensor measurement and the resulting revolution result is used. When the difference is large, the calculated revolution is discarded. The following analysis is intended to explain this.

Assume an error, e, is present in the motor angle measurement. For the case of the brushless motor sensor, this error will be a quantisation error. Then the analysis above is modified as below:

| | |
|---|---|
| The motor sensor will measure: | $m = (M + e)_{(\text{mod } 1)}$ |

The sensor to prediction difference is:

$$d = m - \text{prediction} = \{(c+r)np/q + e\}_{(\text{mod}1)} - cnp/q$$

The residue of the difference is:

$$d_{(\text{mod}1)} = [\{(c+r)np/q + e\}_{(\text{mod}1)} - cnp/q]_{(\text{mod}1)}$$
$$= \{cnp/q\}_{(\text{mod}1)} + ((rnp/q))_{(\text{mod}1)} - \{cnp/q\}_{(\text{mod}1)} + e_{(\text{mod}1)}$$
$$= \{rnp/q\}_{(\text{mod}1)} + e_{(\text{mod}1)}$$

Thus:

$$L = qd_{(\text{mod } 1)} = q\{rnp/q + e\}_{(\text{mod } 1)}$$

The revolution number is calculated from a look-up table that uses L as an index. The integer value of L is obtained by using a round(.) function. When an error, e, is present the value of round(L) will be:

$$\text{round}(L) = q\{rnp/q\} \quad \text{for} \quad -0.5 < e \leq 0.5$$
$$\qquad\qquad\quad q\{rnp/q + 1\} \quad \text{for} \quad 0.5 < e \leq 1.5$$
$$\qquad\qquad\quad q\{rnp/q + 2\} \quad \text{for} \quad 1.5 < e \leq 2.5$$

etc.

Let $$\beta = L - \text{round}(L).$$

Only assume that a revolution estimate is valid when $|\beta|<t$ (where t is a positive threshold, t<0.5). Then value of round(L) becomes:

$$\begin{aligned}
\text{round}(L) &= q\{rnp/q\} && \text{for } -t < e \leq t \\
&\text{not valid} && \text{for } t < e \leq (1-t) \\
&q\{rnp/q+1\} && \text{for } (1-t) < e \leq (1+t) \\
&\text{not valid} && \text{for } (1+t) < e \leq (2-t) \\
&q\{rnp/q+2\} && \text{for } (2-t) < e \leq (2+t)
\end{aligned}$$

etc.

Thus, with t less than 0.5, this filter increases the size of error that is required to allow an erroneous revolution number to be generated from $|e|>0.5$ to $|e|>(1-t)$. The disadvantage is that the number of valid revolution estimates is reduced FIG. 14 shows how the revolution number is calculated from the motor and column angle measurements. The system is similar to "method 4" but incorporates the filter described above and the factor for the brushless motor angle sensor. The main blocks are:

Gain
  Multiplies the column angle by n p/q to give the "predicted" motor angle. Note that this prediction includes the number of repeats per motor shaft revolution, n.

Calculate difference
  A summing block is used to calculate the difference, d, between the measured motor angle and the predicted motor angle. An offset can be introduced to this sum to compensate for the misalignment of the motor and column sensors. Another offset may be required to null out the average quantisation error. In the case shown in FIG. 6, the offset for the quantisation error will be 1/12 of a motor sensor cycle.

Modular-1
  Calculates the residue of the difference d.

Gain
  Multiplies the residue of the difference by q.

Round
  Rounds the scaled residue of the difference to the nearest integer. This integer is used as an index for the look-up table.

Look-up table
  Looks-up the revolution number using the index. The contents of the look-up table will depend on the values of n, p and q. The look-up table can be calculated in this case by considering the values of the inputs and intermediate variables for each column revolution. Table 5 gives an example for n=3, p=17 and q=5. The first row of table 5 is the column revolution number. The bottom row of table 5 is the look-up index. It is assumed that the column revolutions of interest are those given in the unshaded areas of table 5. The look-up table must output the top row of table 5 against the index given in the bottom row of table 5.

TABLE 5

Example with p = 17 and g = 5

| Column revolutions = r | -3 | -2 | -1 | 0 | 1 | 2 | 3 | 4 | 5 | 6 |
|---|---|---|---|---|---|---|---|---|---|---|
| Column sensor output =c | 0 | 0 | 0 | 0 | 0 | 0 | 0 | 0 | 0 | 0 |
| No. of motor sensor = (c + r) np/q revolutions | -30, -40, -6 | -, 20, 4 | -, 10, 2 | 0 | 10, 2 | 20, 4 | 30, 6 | 40, 8 | 50, 10 | 60, 12 |
| No. of motor sensor = w revolutions | -31 | -21 | -11 | 0 | 10 | 20 | 30 | 40 | 50 | 60 |
| Motor angle sensor = m output | 0.4 | 0.6 | 0.8 | 0 | 0.2 | 0.4 | 0.6 | 0.8 | 0 | 0.2 |
| Prediction P = cnp/q | 0 | 0 | 0 | 0 | 0 | 0 | 0 | 0 | 0 | 0 |
| Difference d = m - P | 0.4 | 0.6 | 0.8 | 0 | 0.2 | 0.4 | 0.6 | 0.8 | 0 | 0.2 |
| Difference * q (look- L = qd up index) | 2 | 3 | 4 | 0 | 1 | 2 | 3 | 4 | 0 | 1 |

Sum
  Calculate "error" term, B.

Window comparator
  Produce a "valid" signal when $|\beta|<t$.

FIG. 15 shows how the revolution calculation block (i.e. FIG. 14) is combined with an accumulate angular position block and a calculate multi-turn signal block as previously described, to generate the steering angle signal. The column angle measurement is accumulated and the accumulated column angle and the calculated revolution number are fed into the calculate multi-turn block.

Method 6: Restricted Detection Range

The systems described above can distinguish a limited number of different revolutions depending on the design of the gearbox and the sensors that are employed. In general, the number of revolutions of the handwheel from lock-to-lock are small—typically between 2 and 4. With some gear ratios it is not possible to get complete coverage of the lock-to-lock range. To take a specific example, with a brushless 3-phase motor angle sensor and a 20.5:1 gearbox ratio, we have:

n=3
q=2
p=41

This only allows 2 different revolutions to be discriminated.

Figure 16:
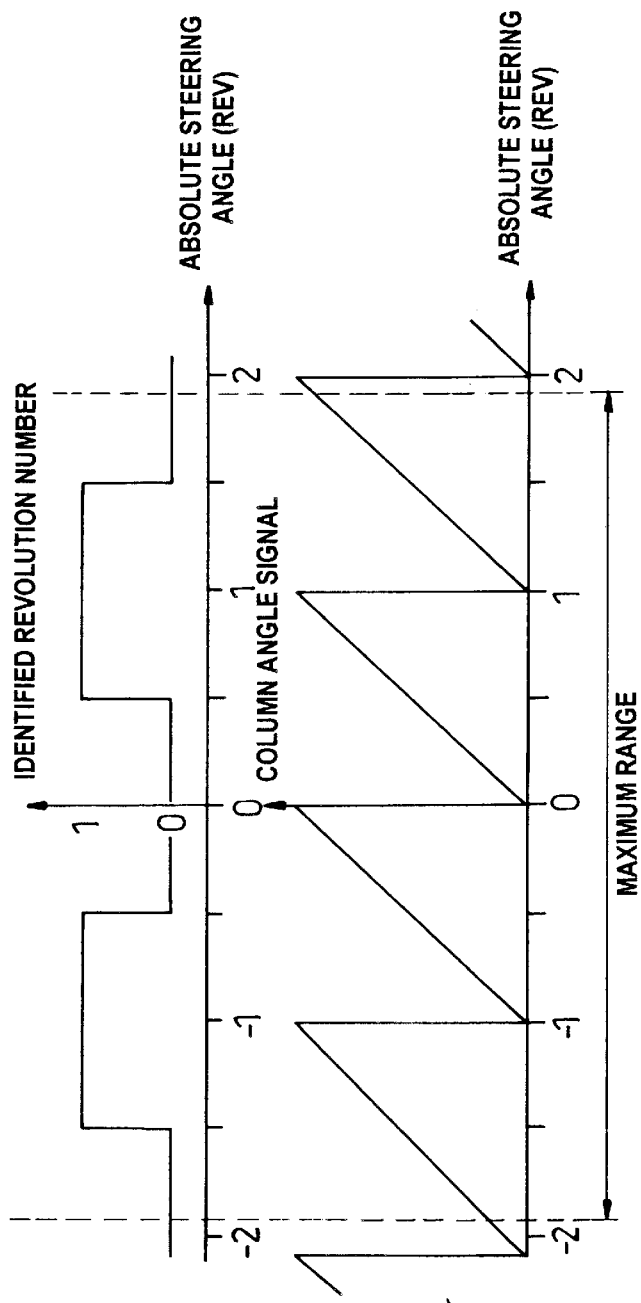
FIG. 16 shows operation over a range of two revolutions unambiguously.

A useful signal can still be obtained by setting the offsets in the system so that the identified revolution is "0" in the central region and "1" in the extreme regions. The straight-ahead angle can then be identified as being the angle in which the identified revolution is "0" and the column angle sensor is at the (column) straight-ahead angle (see FIG. 16). Such an arrangement allows a range from {−2 revolutions÷guard band} to {+2 revolutions−guard band} which is nearly 4 turns lock-to-lock (with 4 complete revolutions from one lock to the other, there are 3 points with a "zero" revolution and the column angle sensor output of 0 therefore the straight-ahead position is no longer unique). The size of the guard band depends on the tolerance stack-up in the steering system and the exact travel of the steering system from lock to lock.

Figure 17:
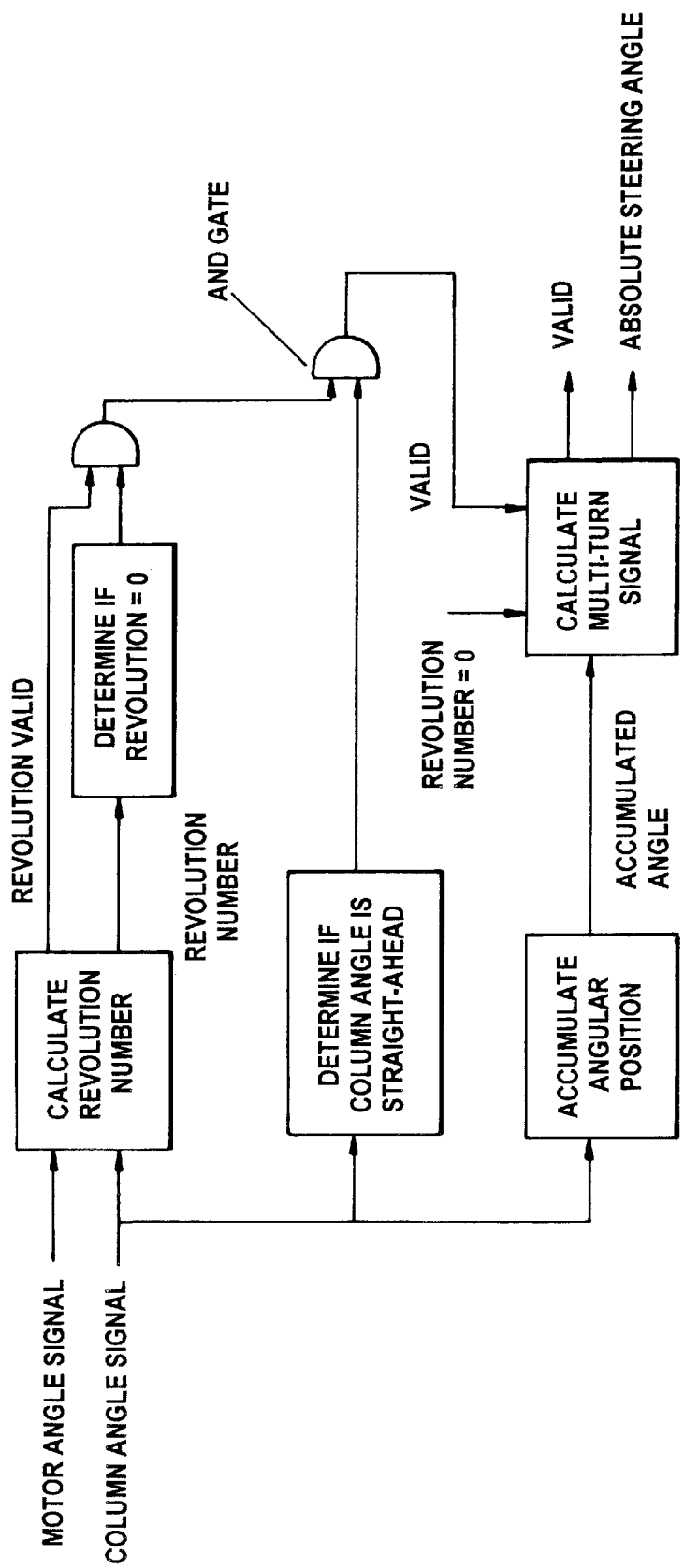
FIG. 17 illustrates a system in which the steering cycle is maintained using an accumulation technique in an alternative embodiment of an electrical power assisted steering system of the present invention.

Once the straight-ahead angle has been identified, the overall steering angle is maintained using the "accumulate angular position" technique described above FIG. 17 shows a scheme for achieving this that uses elements that have been described above. Essentially, the steering angle is only set when the handwheel passes through the straight-ahead condition.

What is claimed is:

1. Electric power assisted steering system comprising: a steering shaft operatively connected at a first end to a handwheel and at its other end operatively connected to at least one roadwheel, an electric motor having a rotor, a gearbox operatively connecting said steering shaft to said rotor, said gearbox having a non-integer reduction gear ratio, a first sensor adapted to produce an output dependent on the angular position of said steering shaft; a second sensor adapted to produce an output dependent on the angular position of said rotor, and processing means adapted to process both output signals to produce an angular position signal indicative of the angular position of said steering shaft over a range of greater than one complete revolution.

2. An electric power assisted steering system according to claim 1 wherein both said sensors are adapted to produce a cyclic output signal dependent upon angular position which repeats after a complete revolution or fraction of a revolution.

3. An electric power assisted steering system according to claim 1 wherein at least one of said sensors comprises an absolute angular position sensor which produces a signal indicative of the absolute angular position of said steering shaft or motor rotor within a complete revolution (or part of a revolution).

4. An electric power assisted steering system according to claim 1 wherein at least one of said sensors comprises an index sensor which is adapted to produce an output signal indicative of the position of the shaft or the motor rotor within a small fraction of a revolution.

5. An electric power assisted steering system according to claim 1 wherein said sensors are driven directly from said steering shaft or motor rotor without intermediate gearing.

6. An electric power assisted steering system according to claim 1 wherein said gear ratio can be expressed as p/q whereby said motor turns through p/q revolutions for each revolution of said steering shaft, p is greater than q, q is grater than unity and the greatest common integer factor of p and q is also unity.

7. An electric power assisted steering system according to claim 1 wherein said first sensor comprises an absolute handwheel position sensor and said second sensor comprises an index sensor adapted to produce an index signal at a known angular position of said motor rotor, said processing means being adapted to sample the output of said first sensor corresponding to the position when said second sensor produces an index signal, multiply said sampled value by p, round said multiplied value to the nearest integer to produce a reference value and use said reference value to access a corresponding entry in a look-up table, said entry being indicative of the number of revolutions of said steering shaft from an arbitrary zero position.

8. An electric power assisted steering system according to claim 1 wherein said first sensing means comprises an index sensor adapted to produce an index signal at a known angular position of said handwheel with said second sensing means comprising an absolute position sensor.

9. An electric power assisted steering system according to claim 1 wherein both sensors comprise absolute position sensors.

10. An electric power assisted steering system according to claim 9 wherein said processing means is adapted to estimate the angular position of said motor rotor from a measurement of the angular position of said steering shaft assuming it is on its "zero" revolution, said estimate is compared with the actual output signal from the second sensor means, and the difference between the estimate and actual values processed to produce a signal indicative of the number of revolutions of said steering shaft relative to an arbitrary zero angular position.

11. An electric power assisted steering system according to claim 1 wherein said second sensor comprises a number of Hall effect sensors adapted to detect the angular position of one or more magnets on said motor rotor.

12. An electric power assisted steering system according to claim 1 wherein said motor comprises a brushless permanent magnet motor and said second sensor comprises a number of Hall effect sensors adapted to detect the position of said magnets.

13. An electric power assisted steering system according to claim 1 wherein said second sensor is further adapted to produce an output signal indicative of angular position of said rotor which undergoes periodic transitions as said rotor rotates, said processing means being adapted to produce a second angular position signal indicative of the angular position of said steering shaft by counting transitions in the output of said second sensor, the count being reset whenever the output of said first sensor corresponds to an index position of said steering shaft, said processing means being adapted to combine both said first and second angular position signals to produce an authoritative angular position signal.

14. An electric power assisted steering system according to claim 13 wherein said processing means is adapted to combined said first and second an angular position signals by normally using said second angular position signal to produce said authoritative output whilst using said first angular position signal to verify said second position signal.

15. An electric power assisted steering system according to claim 14 in which in the event that said two angular position signals differ, said first output is used as the basis for said authoritative output until said first sensor produces an index signal and the count is reset.

* * * * *